United States Patent
Shimizu et al.

(10) Patent No.: US 10,515,078 B2
(45) Date of Patent: Dec. 24, 2019

(54) DATABASE MANAGEMENT APPARATUS, DATABASE MANAGEMENT METHOD, AND STORAGE MEDIUM

(71) Applicants: Hitachi, Ltd., Tokyo (JP); THE UNIVERSITY OF TOKYO, Tokyo (JP)

(72) Inventors: Akira Shimizu, Tokyo (JP); Shinji Fujiwara, Tokyo (JP); Kazuhiko Mogi, Tokyo (JP); Nobuo Kawamura, Tokyo (JP); Kazuo Goda, Tokyo (JP); Masaru Kitsuregawa, Tokyo (JP)

(73) Assignees: Hitachi, Ltd., Tokyo (JP); The University of Tokyo, Tokyo (JP)

( * ) Notice: Subject to any disclaimer, the term of this patent is extended or adjusted under 35 U.S.C. 154(b) by 1016 days.

(21) Appl. No.: 14/905,017

(22) PCT Filed: Aug. 30, 2013

(86) PCT No.: PCT/JP2013/073271
§ 371 (c)(1),
(2) Date: Jan. 14, 2016

(87) PCT Pub. No.: WO2015/029208
PCT Pub. Date: Mar. 5, 2015

(65) Prior Publication Data
US 2016/0154848 A1    Jun. 2, 2016

(51) Int. Cl.
*G06F 17/30* (2006.01)
*G06F 16/2453* (2019.01)
(Continued)

(52) U.S. Cl.
CPC ........ *G06F 16/24545* (2019.01); *G06F 16/21* (2019.01); *G06F 16/2455* (2019.01); *G06F 16/24542* (2019.01)

(58) Field of Classification Search
None
See application file for complete search history.

(56) References Cited

U.S. PATENT DOCUMENTS

2007/0022100 A1    1/2007   Kitsuregawa et al.
2009/0043728 A1*   2/2009   Barsness ............... G06F 9/5083
(Continued)

FOREIGN PATENT DOCUMENTS

JP    2007-034414 A    2/2007

OTHER PUBLICATIONS

International Search Report of PCT/JP2013/073271.

*Primary Examiner* — Hung D Le
(74) *Attorney, Agent, or Firm* — Mattingly & Malur, PC

(57) ABSTRACT

Provided is a database management apparatus, having a processor, a memory, and a storage device, whereby a database which is stored in the storage device is managed, the database management apparatus further comprising: a query acceptance unit which accepts a query to the database; a query execution plan generating unit which generates a query execution plan which includes a database operation which is necessary for executing the accepted query; and a query execution unit which, in executing the accepted query on the basis of the generated query execution plan, dynamically generates a task for executing the database operation, and executes the dynamically generated task. The query execution unit acquires a resource usage state, and, when executing the next database operation, generates a new task on the basis of the resource usage state, and executes the new task in parallel with the task.

14 Claims, 39 Drawing Sheets

(51) Int. Cl.
  *G06F 16/21*     (2019.01)
  *G06F 16/2455*   (2019.01)

(56)          References Cited

U.S. PATENT DOCUMENTS

| | | | |
|---|---|---|---|
| 2009/0043745 A1* | 2/2009 | Barsness | G06F 11/2023 |
| 2009/0327216 A1* | 12/2009 | Brown | G06F 16/24549 |
| 2009/0327242 A1* | 12/2009 | Brown | G06F 16/24542 |
| 2011/0022584 A1 | 1/2011 | Kitsuregawa et al. | |
| 2011/0258179 A1* | 10/2011 | Weissman | G06F 16/24544 |
| | | | 707/714 |
| 2012/0005191 A1 | 1/2012 | Kitsuregawa et al. | |
| 2012/0173513 A1* | 7/2012 | Agrawal | H05K 999/99 |
| | | | 707/716 |
| 2012/0259838 A1 | 10/2012 | Kitsuregawa et al. | |
| 2013/0198166 A1* | 8/2013 | Prout | G06F 16/24524 |
| | | | 707/718 |
| 2014/0156633 A1* | 6/2014 | Duan | G06F 16/24545 |
| | | | 707/713 |
| 2015/0026692 A1* | 1/2015 | Ghosh | G06F 9/4881 |
| | | | 718/103 |

* cited by examiner

```
Part TABLE :
CREATE TABLE PART ( c1 INTEGER, c2 INTEGER )
Part INDEX :
CREATE INDEX IDX_PART ON PART ( c1 )
Lineitem TABLE :
CREATE TABLE LINEITEM ( c3 INTEGER, c4 CHAR(10) )
Lineitem INDEX :
CREATE INDEX IDX_LINEITEM ON LINEITEM ( c3 )
```

*Fig. 2*

| c1 | c2 |
|---|---|
| 10 | id11 |
| ⋮ | ⋮ |
| 130 | id130 |
| 130 | id131 |
| 130 | id132 |
| 130 | id133 |
| 130 | id134 |
| 130 | id135 |
| 130 | id136 |
| 130 | id137 |
| 130 | id138 |
| 130 | id139 |
| ⋮ | ⋮ |
| 300 | id301 |

2051 Part TABLE
2052  2053

2054 Lineitem TABLE

| c3 | c4 |
|---|---|
| id11 | A |
| ⋮ | ⋮ |
| id130 | D |
| id131 | E |
| id132 | A |
| id133 | B |
| id134 | C |
| id135 | F |
| id136 | G |
| id137 | F |
| id138 | G |
| id139 | G |
| ⋮ | ⋮ |
| id301 | Z |

```
SELECT    c1, c1*100, c4
FROM      part, lineitem
WHERE     c1 = 130 and c2 = c3
```

| P21, | 2 |
| P22, | 1 |
| P23, | 4 |
| P24, | 2 |
| P120, | 1 |
| P121, | 4 |
| P220, | 2 |
| P221, | 1 |
| P321, | 4 |
| P322, | 4 |

147 DB AREA MANAGEMENT TABLE

| DB OBJECT | | PAGE NUMBER | STORAGE AREA NAME |
|---|---|---|---|
| IDX_PART | | P1~P20 | STORAGE AREA #1 |
| PART | (1) | P21~P50 | STORAGE AREA #1 |
| | (2) | P121~P150 | STORAGE AREA #2 |
| | (3) | P221~P250 | STORAGE AREA #3 |
| | (4) | P321~P250 | STORAGE AREA #4 |
| IDX_LINEITEM | | P101~P120 | STORAGE AREA #2 |
| LINEITEM | (1) | P51~P100 | STORAGE AREA #1 |
| | (2) | P151~P200 | STORAGE AREA #2 |
| | (3) | P251~P300 | STORAGE AREA #3 |
| | (4) | P351~P400 | STORAGE AREA #4 |

1431 COST TABLE

| PROCESSING STEP | CPU COST |
|---|---|
| PROCESSING STEP#1 | 30 |
| PROCESSING STEP#2 | 10 |
| PROCESSING STEP#3 | 30 |
| PROCESSING STEP#4 | 10 |
| PROCESSING STEP#5 | 5 |
| PROCESSING STEP#6 | 40 |

1432    1433

| | | |
|---|---|---|
| 74d | SEARCH CONDITION | c1 = 130 |
| 74e | PAGE NUMBER | 7 |
| 74f | SLOT NUMBER | 2 |
| 74g | PROCESSING RowID NUMBER | 1 |

74B

| | | |
|---|---|---|
| 74h | PAGE NUMBER | P21 |
| 74i | SLOT NUMBER | 2 |

74C

154 SYSTEM PERFORMANCE THRESHOLD TABLE

| | |
|---|---|
| 1541 CPU USAGE | 90 % |
| 1542 DISK TRANSFER RATE | 2000 MB/s |
| 1543 IOPS | 60000 IOPS |
| 1544 PACKET TRANSFER RATE | -1 pps |

*Fig. 27*

155 PERFORMANCE DATA TABLE

| | |
|---|---|
| 1551 CPU USAGE | 45 % |
| 1552 DISK TRANSFER RATE | 200 MB/s |
| 1553 IOPS | 50000 IOPS |
| 1554 PACKET TRANSFER RATE | -1 pps |

*Fig. 28*

157 STORAGE AREA PERFORMANCE DATA TABLE

| STORAGE AREA NAME | METRIC | VALUE |
|---|---|---|
| STORAGE AREA#1 | OUTSTANDING I/O COUNT | 3 |
| | DISK TRANSFER RATE | 0 MB/s |
| | IOPS | 0 IOPS |
| STORAGE AREA#2 | OUTSTANDING I/O COUNT | 0 |
| | DISK TRANSFER RATE | 0 MB/s |
| | IOPS | 0 IOPS |
| STORAGE AREA#3 | OUTSTANDING I/O COUNT | 0 |
| | DISK TRANSFER RATE | 0 MB/s |
| | IOPS | 0 IOPS |
| STORAGE AREA#4 | OUTSTANDING I/O COUNT | 0 |
| | DISK TRANSFER RATE | 0 MB/s |
| | IOPS | 0 IOPS |

154A STORAGE AREA PERFORMANCE THRESHOLD TABLE

| STORAGE AREA # NAME | ITEM | VALUE |
|---|---|---|
| STORAGE AREA#1 | DISK TRANSFER RATE | 500 MB/s |
|  | IOPS | 15000 IOPS |
| STORAGE AREA#2 | DISK TRANSFER RATE | 500 MB/s |
|  | IOPS | 15000 IOPS |
| STORAGE AREA#3 | DISK TRANSFER RATE | 500 MB/s |
|  | IOPS | 15000 IOPS |
| STORAGE AREA#4 | DISK TRANSFER RATE | 500 MB/s |
|  | IOPS | 15000 IOPS |

```
SELECT      c1, c1*100, c4
FROM        part, lineitem
WHERE       c1 = 130 and c4 = "z" and c2 = c3
```

1431 COST TABLE

| PROCESSING STEP | CPU COST |
|---|---|
| PROCESSING STEP#1 | 10 |
| PROCESSING STEP#2 | 30 |
| PROCESSING STEP#3 | 10 |
| PROCESSING STEP#4 (Build PROCESSING) | 10 |
| PROCESSING STEP#4 (Probe PROCESSING) | 10 |
| PROCESSING STEP#5 | 40 |

1530-5 CONTEXT

| | | |
|---|---|---|
| 1531 | STARTING STEP | PROCESSING STEP #1 |
| 1532 | INTERMEDIATE RESULT | |
| 1533 | GENERATABLE NUMBER | 4 |
| 1534 | EXECUTION STATE | |
| 1535 | STORAGE AREA NAME | STORAGE AREA #1 |
| 1536 | I/O SIZE | 64 kB |
| 1537 | I/O PATTERN | SEQUENTIAL |
| 1538 | CPU COST | 20 |

Fig. 37

1530-6 CONTEXT

| | |
|---|---|
| STARTING STEP | PROCESSING STEP #1 |
| INTERMEDIATE RESULT | |
| GENERATABLE NUMBER | 400 |
| EXECUTION STATE | |
| STORAGE AREA NAME | NONE |
| I/O SIZE | 0 |
| I/O PATTERN | NONE |
| CPU COST | 20 |

*Fig. 38*

1530-7 CONTEXT

| | |
|---|---|
| STARTING STEP | PROCESSING STEP #2 |
| INTERMEDIATE RESULT | |
| GENERATABLE NUMBER | 3 |
| EXECUTION STATE | |
| STORAGE AREA NAME | STORAGE AREA #1 |
| I/O SIZE | 4 kB |
| I/O PATTERN | RANDOM |
| CPU COST | 90 |

*Fig. 39*

147A DB AREA MANAGEMENT TABLE

| DB OBJECT | | PAGE NUMBER | DBMS IDENTIFIER | STORAGE AREA NAME |
|---|---|---|---|---|
| IDX_PART | | P1~P20 | DBMS1 | STORAGE AREA#1 |
| PART | (1) | P21~P50 | DBMS1 | STORAGE AREA#1 |
| | (2) | P121~P150 | DBMS2 | STORAGE AREA#2 |
| | (3) | P221~P250 | DBMS3 | STORAGE AREA#3 |
| | (4) | P321~P250 | DBMS4 | STORAGE AREA#4 |
| IDX_LINEITEM | | P101~P120 | DBMS2 | STORAGE AREA#2 |
| LINEITEM | (1) | P51~P100 | DBMS1 | STORAGE AREA#1 |
| | (2) | P151~P200 | DBMS2 | STORAGE AREA#2 |
| | (3) | P251~P300 | DBMS3 | STORAGE AREA#3 |
| | (4) | P351~P400 | DBMS4 | STORAGE AREA#4 |

DATABASE MANAGEMENT APPARATUS, DATABASE MANAGEMENT METHOD, AND STORAGE MEDIUM

BACKGROUND

This invention relates to a data management technology.

In corporate activities, it is essential to utilize business data that is produced in large amounts. Consequently, a system configured to analyze a database (hereinafter referred to as "DB") storing a large amount of business data has already been proposed.

In the analysis processing, a database management system (hereinafter referred to as "DBMS") is configured to receive a query and issue a data read request to a storage device storing the DB.

In JP 2007-34414 A, there is disclosed a known technology for reducing data reading latency during the processing of one query. In JP 2007-34414 A, a DBMS is configured to generate a plan (hereinafter referred to as "query execution plan"), which is a combination of a plurality of database operations (referred to as "DB operation" or "processing step") required for executing a query, dynamically generate tasks for executing the processing steps, and execute the tasks in parallel to multiplex a data read request. In JP 2007-34414 A, the DMBS is configured to increase the number of tasks to a predetermined number, and subsequently generate tasks so that the number of tasks is maintained at that predetermined number.

SUMMARY

In recent years, computer performance has been advancing. For example, processors including a plurality of cores configured to perform calculations (such a core is referred to as "processor core") are now common. A computer may have a plurality of processor cores by installing a plurality of such processors. Hitherto, a storage apparatus has been directly coupled to a hard disk drive (HDD). However, configurations in which a storage apparatus including a plurality of HDDs is coupled by a high speed network are becoming common.

A DMBS that dynamically generates tasks is configured to reduce the processing time of a query by executing a plurality of tasks and utilizing resources that are used to execute the queries, such as CPU resources, I/O resources, and memory resources of the computer. I/O (input/output) refers to an operation in which data is input from an external apparatus (e.g., a storage apparatus or another computer) coupled to the computer via a network, or an operation in which the computer outputs data to the external apparatus. An I/O request is an input request from the external apparatus or an output request to the external apparatus. For example, the I/O request is issued from the computer executing the DBMS to the external apparatus. An I/O request issued to a storage apparatus is an input request from the storage apparatus or an output request to the storage apparatus. An I/O request issued to another computer is an input request from the another computer or an output request to the another computer.

However, in the above-mentioned related art, for a DBMS configured to dynamically generate tasks, it is required to specify the task count. Therefore, in the above-mentioned related-art DBMS, there is a problem in that if there is a mistake in the specified task count, resources, such as the CPU resources, the memory resources, and the I/O resources, cannot be utilized effectively, and hence the query processing time cannot be reduced.

Further, in the above-mentioned related-art DBMS, the processing is different for each query, and the CPU resources, the memory resources, the I/O resources, and the like are used differently. As a result, it may not be possible to sufficiently use the CPU resources, the memory resources, and the I/O resources even if the task count is set appropriately.

Therefore, it is an object of this invention to control the generation of tasks so that a DBMS configured to dynamically generate tasks can effectively utilize resources, such as the CPU resources, the memory resources, and the I/O resources.

In this case, the term "CPU resources" refers to the CPU (processor cores) or the processing capability of the CPU. The CPU resources are consumed by the execution processing of tasks allocated to a DB operation by the DBMS.

Further, the term "memory resources" refers to the memory (available storage space) installed in the computer. The memory resources are consumed by the tasks storing data in the memory.

The term "I/O resources" refers to the resources having an effect on the performance (data reading latency etc.) of I/O requests issued based on execution of a task in the DBMS. Examples of the I/O resources include a computer, a storage apparatus, or a network coupling a computer and a storage apparatus, or, the performance of a computer, a storage apparatus, or a network coupling a computer and a storage apparatus. Specific examples include the performance of a network adapter for coupling a computer to a network, and the performance (bandwidth etc.) of a network cable for transferring I/O requests or the data corresponding to those I/O requests. Further, examples of the I/O resources include the performance of a network adapter for coupling a storage apparatus for processing I/O requests issued from a computer with the storage apparatus to a network, the processing performance of a processor for processing I/O requests with a storage apparatus, and the capacity of a HDD for recording data. The I/O performance of the I/O resources is influenced by the number of I/O requests that can be simultaneously issued by the network adapter, the upper limit of the data transfer rate of the network cable, the number of HDDs processing the I/O requests, and the like. The I/O resources are consumed during processing of the I/O requests by execution of a task in the DBMS.

A representative aspect of the present disclosure is as follows. A database management apparatus configured to manage a database stored in a storage apparatus, the database management apparatus comprising: a query reception module configured to receive a query to the database; a query execution plan generation module configured to generate a query execution plan comprising information representing one or more database operations required to execute the received query; and a query execution module configured to dynamically generate, when executing the received query based on the generated query execution plan, a task for executing a database operation and to execute the dynamically generated task, the query execution module being configured to: acquire a usage of resource to be utilized to execute the received query; generate a new task based on the utilization situation of the resources when executing a next database operation of the database operation to be executed by the generated task; and execute the new task in parallel with the generated task.

According to the one embodiment of this invention, in the database management apparatus configured to dynamically generate tasks, the tasks can be generated so that the utilization of resources, such as the CPU resources, the memory resources, the I/O resources, and the like, utilized to execute a query is sufficient. Further, when the database management apparatus is generating tasks, a usage of resources, such as the CPU resources, the memory resources, the I/O resources, and the like, utilized to execute a query can be improved by generating a task that utilizes resources that are not being sufficiently utilized.

BRIEF DESCRIPTION OF THE DRAWINGS

FIG. 2 is a diagram for showing definitions in the table and the index of the DB according to the first embodiment.

FIG. 3 is a diagram for showing an example of the Part table of the DB according to the first embodiment.

FIG. 4 is a diagram for showing an example of the Lineitem table of the DB according to the first embodiment.

FIG. 5 is a diagram for showing an example of a first query of the DB according to the first embodiment.

FIG. 10 is a diagram for showing an example of the DB area management table according to the first embodiment.

FIG. 27 is a diagram for showing an example of a system performance threshold table according to the first embodiment.

FIG. 28 is a diagram for showing an example of the performance data table according to the first embodiment.

FIG. 30 is a diagram for showing an example of a storage area performance data table according to the first embodiment.

FIG. 32 is a diagram for showing a storage area performance threshold table according to a second embodiment.

FIG. 36 is a diagram for showing an example of the cost table in which a CPU cost is set for each processing step according to the third embodiment.

FIG. 37 is a diagram for showing an example of a fifth context according to the third embodiment.

FIG. 38 is a diagram for showing an example of a sixth context according to the third embodiment.

FIG. 39 is a diagram for showing an example of a seventh context according to the third embodiment.

FIG. 44 is a diagram for showing an example of the DB area management table according to the sixth embodiment.

DETAILED DESCRIPTION OF THE PREFERRED EMBODIMENTS

First Embodiment

A first embodiment of this invention is described below with reference to the drawings.

Figure 1A:
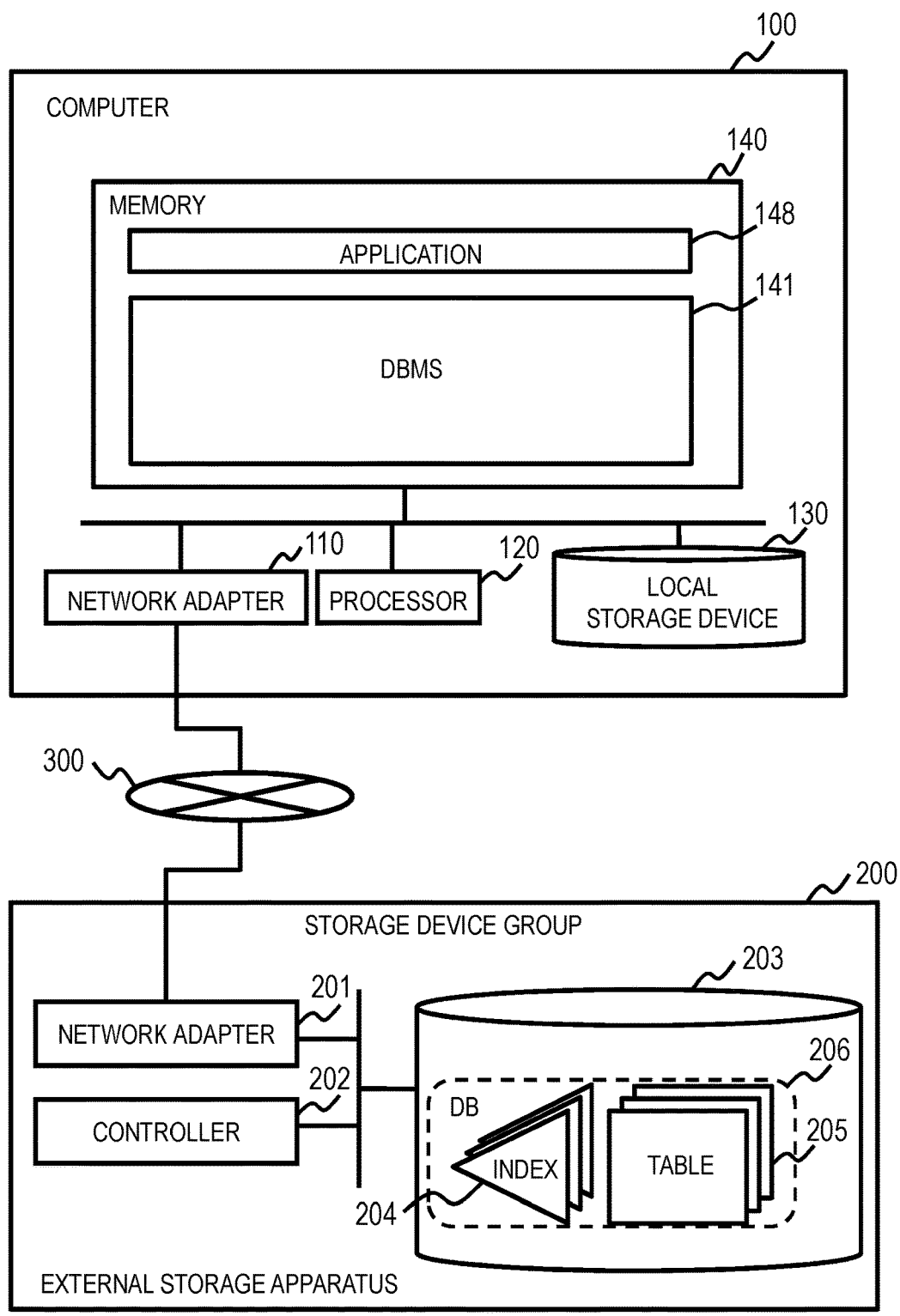
FIG. 1A is a block diagram for illustrating an example of a computer system according to a first embodiment of this invention.
Figure 1B:
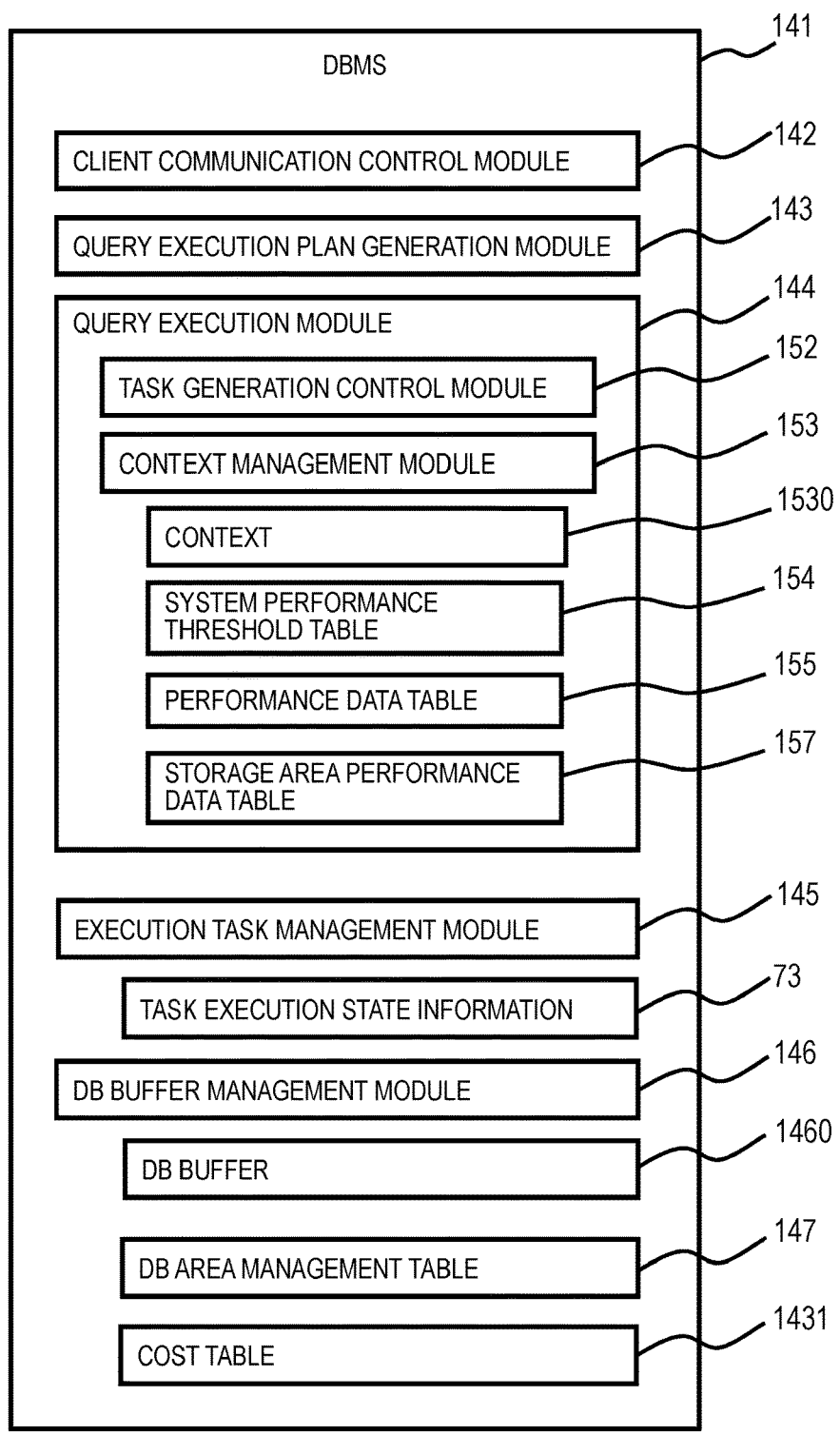
FIG. 1B is a block diagram for illustrating an example of a DBMS executed by a computer according to the first embodiment of this invention.

FIG. 1A is a block diagram for illustrating an example of a computer system according to the first embodiment of this invention. Further, FIG. 1B is a block diagram for illustrating an example of a DBMS executed by a computer 100.

The computer system includes the computer 100 and an external storage apparatus 200. The computer 100 and the external storage apparatus 200 are coupled to each other via a communication network 300. Examples of the communication protocol used on the communication network 300 include Fibre Channel (FC), Small Computer System Interface (SCSI), InfiniBand (IB), Transmission Control Protocol/Internet Protocol (TCP/IP), and the like.

The computer 100 is, for example, a personal computer, a work station, or a mainframe. The computer 100 includes a network adapter 110, a processor (typically, a microprocessor (e.g., a central processing unit (CPU))) 120, a local storage device 130, and a memory 140.

The processor 120 is configured to execute computer programs, such as, for example, an operating system (OS) (not shown) and a database management system (DBMS) 141. Each of one or a plurality of the processors 120 includes one or a plurality of processor cores. Each processor core may execute processing independently from or in parallel with each of the other processor cores.

The memory 140 temporarily stores a program to be executed by the processor 120 and data to be used by the program. In this embodiment, the memory 140 stores data and the DBMS 141 which is a program for performing database (DB) management and a series of related processes. The memory 140 may also store an application program (AP) 148 for issuing a query to the DBMS 141.

The local storage device 130 stores programs of the computer 100 and data to be used by the programs. The local storage device 130 is a non-volatile storage medium, such as, for example, a magnetic disk, a flash memory, or some other non-volatile semiconductor memory.

The network adapter 110 is configured to couple the communication network 300 and the computer 100. Further, the processor 120 may be an element included in a control device coupled to the network adapter 110, the memory 140, and the like. The control device may include not only the processor 120, but also dedicated hardware circuits (e.g., a circuit for performing at least one of encoding and decoding of data, and a circuit for performing at least one of compressing and extracting of data).

It should be noted that, from the perspectives of performance and redundancy, the computer 100 may include a plurality of at least one element selected from the network adapter 110, the processor 120, the local storage device 130, and the memory 140. Further, the computer 100 may also include an input device (not shown) (e.g., a keyboard or a pointing device) and a display device (not shown) (i.e., a liquid crystal display). The input device and the display device may be integrated.

The computer 100 is a database management apparatus in which the DBMS 141 executes a query issued to a database 206. The query is issued by the AP 148, which is executed by the computer 100, or is issued by an AP that is executed by a computer (not shown) (a client) coupled to the communication network 300.

The DBMS 141 is configured to execute the query issued by the AP 148, and in connection with the execution of the query, transmit to the external storage apparatus 200 via the OS an I/O request to the DB 206 stored in the external storage apparatus 200.

It should be noted that, in this embodiment, there is one DBMS 141 executed by the computer 100, but a plurality of DBMSs 141 may be executed. It should also be noted that the OS (not shown) may be a guest OS executed on a virtual machine generated by a virtualization program. Further, the OS on the virtual machine may execute the DBMS 141. In addition, there may be a plurality of virtual machines executed by the computer 100.

The external storage apparatus 200 stores data to be used by the computer 100. The external storage apparatus 200 is configured to receive an I/O request from the computer 100, execute processing corresponding to the I/O request, and transmit a processing result to the computer 100.

The external storage apparatus 200 includes a network adapter 201, a storage device group 203, and a controller 202 coupled to those elements.

The network adapter 201 is configured to couple the external storage apparatus 200 to the communication network 300.

The storage device group 203 includes one or more storage devices. The storage devices are each a non-volatile storage medium, such as, for example, a magnetic disk, a flash memory, or some other non-volatile semiconductor memory. The storage device group 203 may be a group for storing data at a predetermined RAID level based on Redundant Array of Independent Disks (RAID).

The computer 100 may also be provided with a logical storage device (logical volume) based on the storage space of the storage device group 203. The storage device group 203 stores the DB 206. The DB 206 includes one or more tables 205 and indices 204.

The table 205 is a collection of one or more records. Each record is constructed from one or more columns. The index 204 is a data structure generated targeting one or more columns in the table 205. The index 204 speeds up access to the table 205 based on a selection condition including a column that the index targets. For example, the index has a data structure storing, for each value in a target column, information (RowID) identifying a record in the table that includes that value. As the index, a B-tree structure may be used. A structural example of the tables 205 in the DB and an example of the relationship among the tables 205 are described later.

The controller 202 includes, for example, a memory (not shown) and a processor (not shown). The controller 202 is configured to input and output data to and from the storage device group 203 storing the DB 206 based on an I/O request from the computer 100. For example, the controller 202 stores data to be written based on a write request from the computer 100 in the storage device group 203, reads data to be read based on a read request from the computer 100 from the storage device group 203, and transmits the data to the computer 100.

It should be noted that, from the perspectives of performance and redundancy, the external storage apparatus 200 may include a plurality of elements such as the controller 202. Further, a plurality of external storage apparatus 200 may also be included.

The DBMS 141 is configured to manage the DB 206, which includes business data. As illustrated in FIG. 1B, the DBMS 141 includes a client communication control module 142, a query execution plan generation module 143, a query execution module 144, an execution task management module 145, a DB buffer management module 146, a DB buffer 1460, a cost table 1431, and a DB area management table 147.

The client communication control module 142 is configured to control communication to/from a client coupled to the communication network 300 or the AP 148 executed by the computer 100. Specifically, the client communication control module (query reception module) 142 receives a query issued from the client (not shown) or the AP 148, and executes processing in order to transmit the processing result of the query as a response to the client or the AP 148. The query may be written in Structured Query Language (SQL), for example.

The query execution plan generation module 143 is configured to generate a query execution plan including one or more processing steps required to execute the query received by the client communication control module 142. The query execution plan is, for example, information defining in a tree structure an execution sequence of the processing steps to be performed when executing the query. The query execution plan is stored in the memory 140. An example of the query execution plan is described later.

The DB buffer management module 146 is configured to manage the DB buffer 1460 (or a DB cache) as a storage area for temporarily storing the data in the DB 206. The DB buffer 1460 is constructed on the memory 140. Alternatively, the DB buffer 1460 may be constructed on the local storage device 130.

The query execution module 144 is configured to dynamically generate a task for performing processing based on the query execution plan generated by the query execution plan generation module 143, access the DB 206 by executing the task, and generate a query result. The query execution module 144 is also configured to transmit to the issuing source of the query the result of access to the DB 206 generated by the task as a response. The query execution module 144 includes a task generation control module 152, a context management module 153, a system performance threshold table 154, and a performance data table 155.

The task generation control module 152 is configured to generate a new task based on a usage of resource when a task generation request is received. The term "resources" refers to the CPU resources (of the processor 120) of the computer to be utilized by executing the query, the I/O resources (of the network adapter 110, the storage device group 203, etc.), the memory resources (of the memory 140), and the like. The utilization situation of the CPU resources is represented by a CPU usage. The utilization situation of the I/O resources is represented by a data transfer amount from an external apparatus, such as the external storage apparatus 200, to the computer 100, a data transfer amount from the computer 100 to an external apparatus, such as the external storage apparatus 200, or a number of I/O requests issued from the computer 100 to an external apparatus, such as the external storage apparatus 200. The data transfer amount may be the data transfer rate, which is the amount of data being transferred per unit time, or may be a cumulative data transfer amount, which is the total amount of data that has been transferred. The number of I/O requests may be inputs/outputs per second (IOPS), which is the number of I/O requests processed per unit time, or may be the cumulative number of I/O requests, which is the total number of I/O requests cumulated, or may be an outstanding I/O count, which is the number of I/O requests that have been issued but for which I/O has not been completed. The utilization situation of the memory resources is represented by a memory usage level. For example, the task generation control module 152 is configured to generate a task when utilization of the CPU resources or the I/O resources is insufficient. Specifically, the task generation control module 152 acquires the utilization situation of the resources, such as the CPU usage at the current point, a disk transfer rate (or a data transfer rate) of the external storage apparatus 200 and the local storage device 130, and the IOPS, and compares the acquired utilization situation of the resources with a CPU usage threshold, a disk transfer rate threshold, and an IOPS threshold set in advance. When the utilization level is less than the thresholds, the task generation control module 152 determines that resources, such as the CPU resources and the I/O resources, are not being sufficiently utilized (or that a predetermined condition is not being satisfied).

Further, when the utilization situation of the resources is insufficient, the task generation control module 152 generates a task. In order to determine whether or not the utilization situation of the resources is sufficient, the task generation control module 152 refers to a value from the system performance threshold table 154, and refers to the performance data table 155 regarding the CPU usage, the disk transfer rate, and the IOPS at the current point.

The context management module 153 is configured to manage a context including information required to execute the newly generated task. The context is information including a first piece of information indicating which of one or more processing steps indicated by the query execution plan the processing step for starting the execution in the task is, a second piece of information on an access destination of the data required in the processing step indicated by the first piece of information, and a third piece of information on the data required for the task to generate a result. The structure of context management information, which is information for managing contexts, is described later.

The system performance threshold table 154 stores in advance thresholds for determining whether or not utilization of the CPU resources and the I/O resources is sufficient. The system performance threshold table 154 is referred to by the task generation control module 152.

The performance data table 155 stores values for determining the current utilization situation of the CPU resources and the I/O resources. The performance data table 155 is referred to by the task generation control module 152.

The execution task management module 145 is configured to manage the task for executing the query. In this case, the task may employ any type of program module. For example, the task may be a process or a thread managed by the OS, or may be a pseudo process or a pseudo thread implemented in the DBMS 141. Further, the task may be a collection of pointers (function pointers) to a function organizing each of the processes into a function. The structure of the task management information, which is information for managing the task, is described later.

At least a part of the processing performed by at least one of the client communication control module 142, the query execution plan generation module 143, the query execution module 144, and the DB buffer management module 146 may be carried out using hardware. Further, in the description of this embodiment, when a processing module is the subject of the sentence, in actual fact the processing is being carried out by the processor 120 configured to execute that processing module. However, when a least a portion of the processing modules is realized using hardware, the hardware may also be used as the subject of the sentence instead of, or in addition to, the processor 120. The computer program executing the DBMS 141 may be installed in the computer 100 from a program source. The program source may be, for example, a storage medium that can be read by the computer 100, or may be another computer.

The configuration of the DBMS 141 illustrated in FIG. 1 is an example. The DBMS 141 may also be configured so that a predetermined processing module is divided into a plurality of processing modules, or so that one processing module integrates the functions of a plurality of processing modules, for example.

Each of the function modules that the DBMS 141 is constructed from, namely, the client communication control module 142, the query execution plan generation module 143, the query execution module 144, the execution task management module 145, and the DB buffer management module 146, are loaded into the memory 140 as a program and executed by the processor 120.

The processor 120 is configured to operate as a function module for realizing a predetermined function by executing processing based on a program of each function module. For example, the processor 120 functions as the query execution module 144 by executing processing based on a query execution program. This is the same for the other programs as well. Further, the processor 120 is also configured to operate as a function module for realizing each of a plurality of processes executed by each program. The computer and the computer system are an apparatus and a system including those function modules, respectively.

Information on the programs, the tables, and the like for realizing each function of the DBMS 141 may be stored in the local storage device 130, the external storage apparatus 200, a storage device such as a non-volatile semiconductor memory, a hard disk drive, and a solid state drive (SSD), or a computer-readable, non-transitory data storage medium such as an IC card, an SD card, and a DVD.

FIG. 2 is a diagram for showing definitions in the table 205 and the index 204 of the DB 206 according to the first embodiment.

The DB 206 includes, as the table 205, for example, a Part table 2051 (shown in FIG. 3) including a column c1 (2052) and a column c2 (2053), and a Lineitem table 2054 (shown in FIG. 4) including a column c3 (2055) and a column c4 (2056).

Further, the DB 206 includes, as the index 204, an index (a Part index) relating to the Part table 2051 and based on the values in the column c1 (2052), and an index (a Lineitem index) relating to the Lineitem table 2054 and based on the values in the column c3 (2055).

FIG. 3 is a diagram for showing an example of the Part table 2051 of the DB 206 according to the first embodiment. The Part table 2051 of the DB 206 is a table that, logically, associates the values in the column c1 (2052) with the corresponding values in the column c2 (2053), for example.

FIG. 4 is a diagram for showing an example of the Lineitem table 2054 of the DB 206 according to the first embodiment. The Lineitem table (2054) of the DB 206 is a table that associates the values in the column c3 (2055) with the corresponding values in the column c4 (2056), for example.

FIG. 5 is a diagram for showing an example of a first query of the DB according to the first embodiment. The query shown in FIG. 5 is an example of the query for the DB 206 having the structure shown in FIG. 2 to FIG. 4 and FIG. 6 to FIG. 8. The query shown in FIG. 5 means that, from the Part table 2051 and the Lineitem table 2054, when the value in column c1 (2052) is "130", and, the value in the column c2 (2053) and the value in the column c3 (2055) are the same, the value in the column c1 (2052) and the value in column c4 (2056) are extracted.

Figures 6, 7:
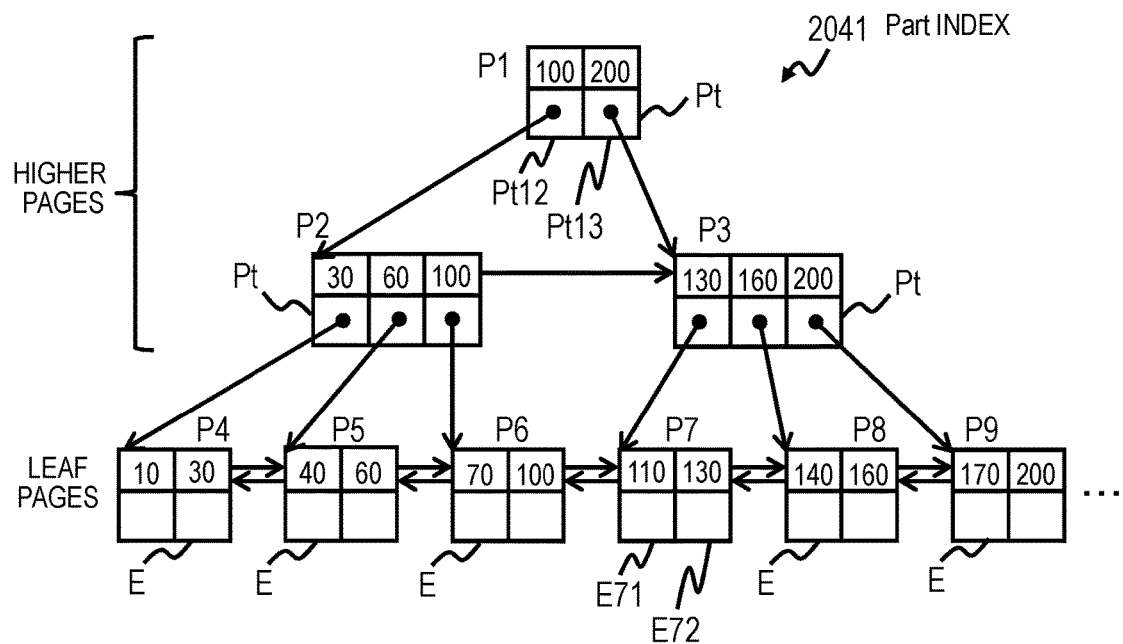
FIG. 6 is a diagram for showing an example of a data structure of a Part index in the DB according to the first embodiment.
FIG. 7 is a diagram for showing an example of a data structure storing RowIDs when a key value is 130 in the Part index of the DB according to the first embodiment.

FIG. 6 is a diagram for showing an example of a data structure of a Part index 2041 in the DB 206 according to the first embodiment.

The Part index 2041 is a B-tree structure for searching, based on a value in the column c1 (2052), for pages in the Part table (P and P1 to P9) and a slot in the pages storing the corresponding record. It should be noted that another data structure may also be used for the data structure of the index, such as an R-tree, a hash, a bitmap, and the like. Similarly, a Lineitem index 2042 is a B-tree structure for searching, based on a value in the column c3 (2055), for pages in the Lineitem table 2054 and a slot in the pages storing the corresponding record.

The term "page" refers to the minimum data unit required for input and output to and from the DB 206. In this embodiment, the Part index 2041 has a B-tree structure in which a page P is an input and output unit. The Part index 2041 includes leaf pages P4 to P9, which are the lowest pages, and higher pages P1 to P3, which are pages higher than the leaf pages. In this case, the highest page (P1) among the higher pages P1 to P3 is referred to as a "root page."

The root page (P1) of the Part index 2041 includes a pointer Pt, which points to a page that is one level lower down, and one or more entries associated with the maximum value among the values in the column c1 (2052) to be managed by that page one level lower down.

For example, the page P1 stores a pointer Pt 12 to the page P2 managing the correspondence relationship with the values in the column c1 (2052) equal to or less than "100", and a pointer Pt 13 to the page P3 managing the correspondence relationship with the values in the column c1 (2052) more than "100" and equal to or less than "200". Similarly, in the higher pages, each page includes a pointer to a page one level lower down, and one or more entries Pt associated with the maximum value among the values in the column c1 (2052) to be managed by that page one level lower down.

On the other hand, the leaf pages store one or more entries E associating a value in the column c1 (2052) with a RowID (e.g., a page number in the Part table 2051 and a slot number in that page), which is a storage position of a record in the Part table corresponding to the value. For example, the page P7, which is a leaf page, stores an entry E71 including the page and the slot number storing the value in the column c2 (2053) corresponding to the value "110" in the column c1 (2052), and an entry E72 including the page and the slot number storing the value in the column c2 (2053) corresponding to the value "130" in the column c1 (2052). It should be noted that the other leaf pages are the same, and are shown in FIG. 6 represented as entries E.

FIG. 7 is a diagram for showing an example of a data structure storing RowIDs when a key value is 130 in the Part index 2041 of the DB 206 according to the first embodiment.

For example, a total of ten RowIDs, such as a slot 2 for a page P21, a slot 1 for a page P22, a slot 4 for a page P23, and the like, are stored in the RowIDs (20411) of the record corresponding to the value "130" in the column c1 (2052) of the Part table 2051 shown in FIG. 3.

Figure 8:
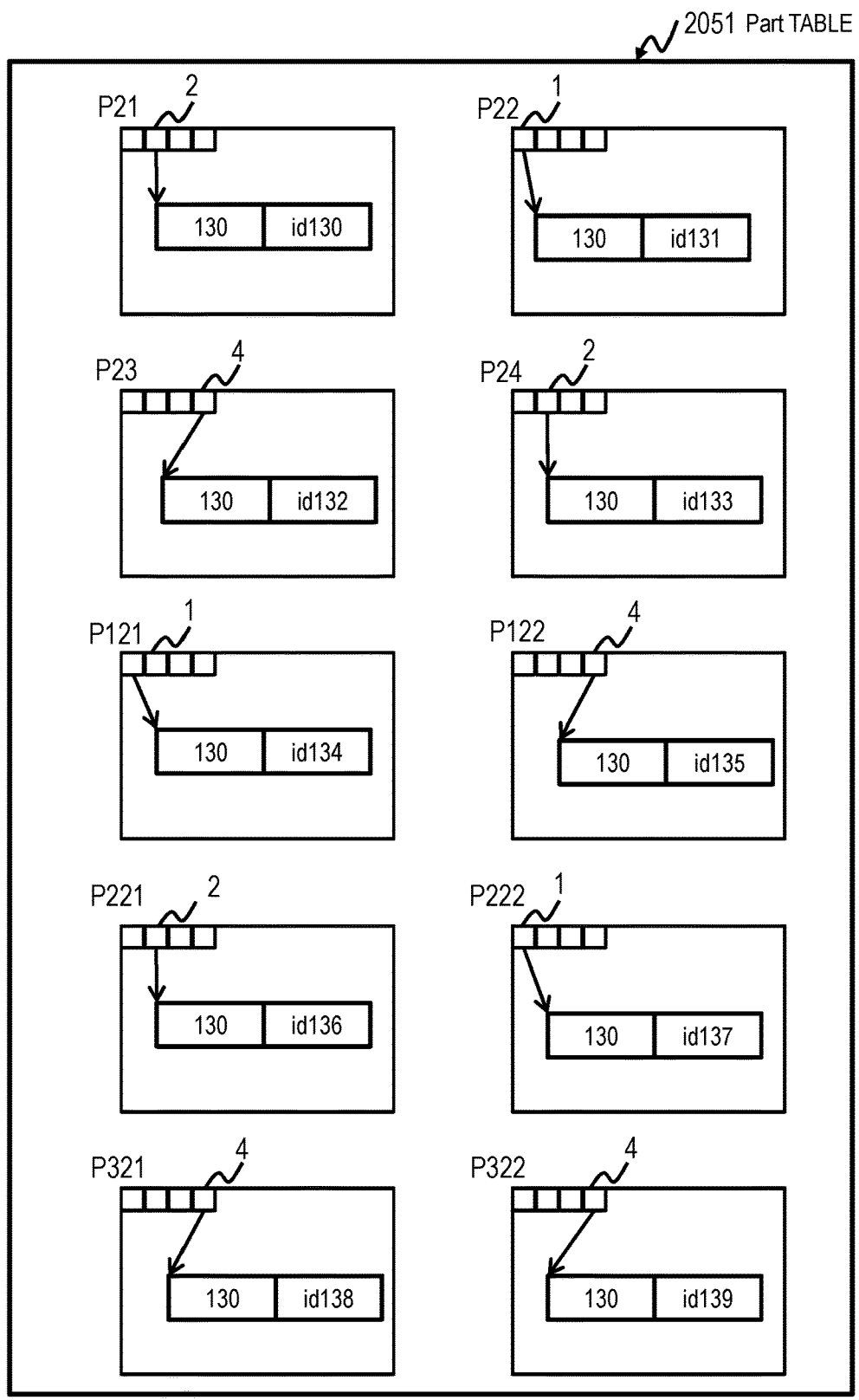
FIG. 8 is a diagram for showing an example a data structure of the Part table when a key value is 130 in the Part index of the DB according to the first embodiment.

FIG. 8 is a diagram for showing an example a data structure of the Part table 2051 according to the first embodiment.

The record in the slot 2 of the page 21 has 130 for the column c1 and an id 131 for the column c2. The record in the slot 1 of the page 22 has 130 for the column c1 and an id 132 for the column c2. The record in the slot 4 of the page 23 has 130 for the column c1 and an id 133 for the column c2. Thus, the RowIDs of the records corresponding to the value "130" in the column c1 shown in FIG. 7 point to the ten records 20411, in which the column c1 is 130.

Figure 9:
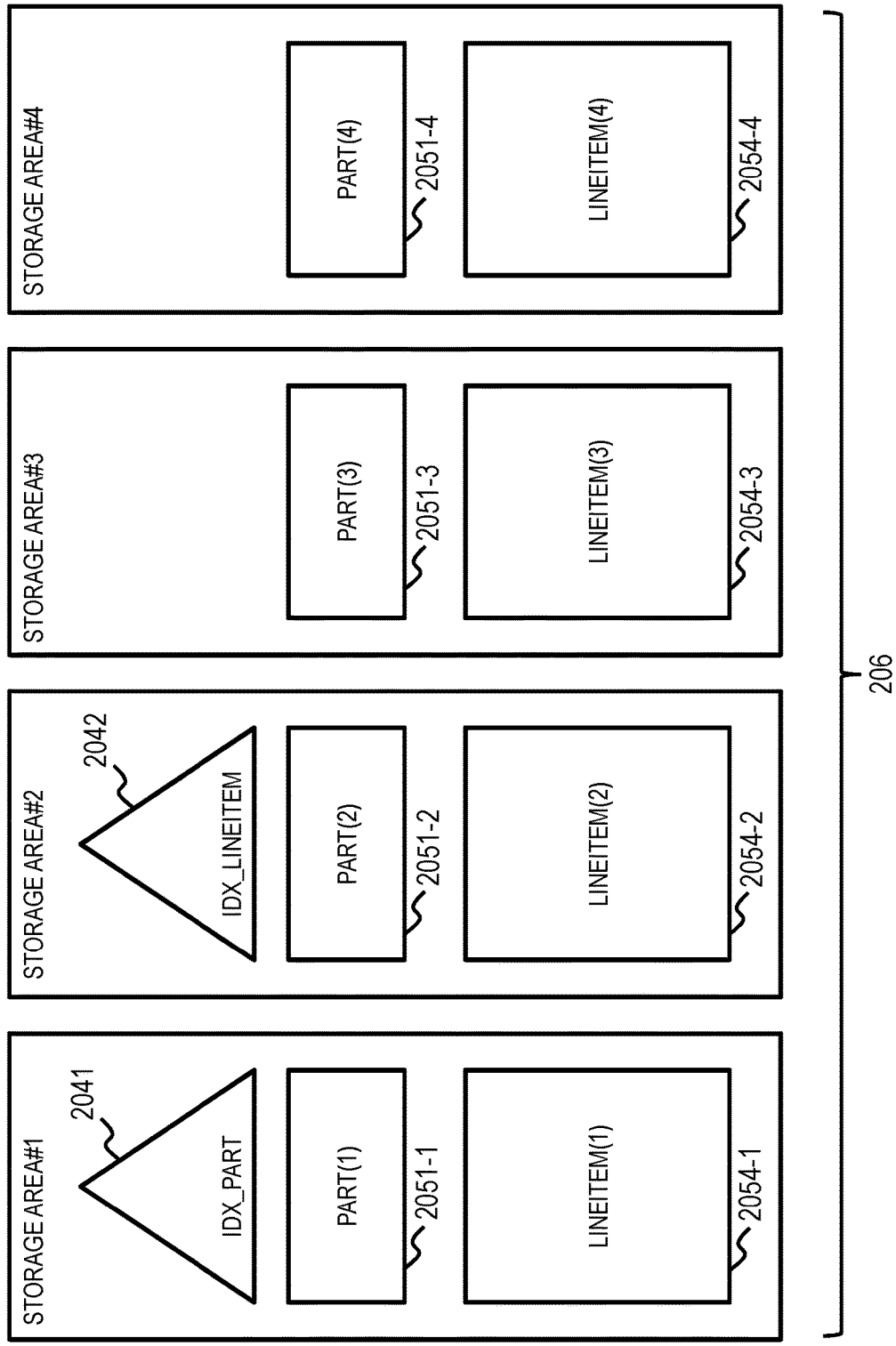
FIG. 9 is a block diagram for illustrating an example of the DB according to the first embodiment.

FIG. 9 is a block diagram for illustrating an example of the DB 206 according to the first embodiment arranged in a plurality of storage areas of the external storage apparatus 200. In FIG. 9, an example is illustrated in which the external storage apparatus 200 is constructed from a plurality of logical storage areas (logical volumes or logical units: LU) #1 to #4, and the index 204 and the table 205 of the DB 206 are dispersed among the storage areas #1 to #4.

In FIG. 9, the index 204 is divided in half into the Part index 2041 and the Lineitem index 2042. The Lineitem table 2054 is divided into four parts, LINEITEM(1) 2054-1 to LINEITEM(4) 2054-4.

A Part index IDX_PART 2041 is stored in the storage area #1, and a Lineitem index IDX_LINEITEM 2041 is stored in the storage area #2.

The Part table 2051 is constructed from four areas (PART (1) 2051-1, PART(2) 2051-2, PART(3) 2051-3, and PART(4) 2051-4). The PART(1) 2051-1 of the Part table is stored in the storage area #1, the PART(2) 2051-2 is stored in the storage area #2, the PART(3) 2051-3 is stored in the storage area #3, and the PART(4) 2051-4 is stored in the storage area #4.

Similarly to the Part table 2051, the Lineitem table 2054 is also constructed from four areas 2054-1 to 2054-4, the areas 2054-1 to 2054-4 being stored in the storage areas #1 to #4, respectively.

FIG. 10 is a diagram for showing an example of the DB area management table 147 according to the first embodiment.

In the DB area management table 147 shown in FIG. 10, one entry is constructed from a DB object (in this embodiment, a Part index, a Part table, a Lineitem index, or, a Lineitem table) 1471, a page number 1472 of the DB object, and a storage area name 1473 indicating which of the storage areas #1 to #4 the page number is stored in. For example, the DB area management table 147 shows that when the DB object 1471 is the Part index IDX_PART, the page number 1472 is P1 to P20, and the page numbers P1 to P20 are stored in the storage area #1. Further, it is also shown that the page numbers in the PART(2) constructing the Part table 2051 are P121 to P150, and that the page numbers P121 to P150 are stored in the storage area #2.

It should be noted that in this embodiment, an example is described in which the DBMS 141 stores the DB area management table 147. However, the DB area management table 147 may be stored in the storage device group 203 of the external storage apparatus 200.

Figures 11, 12:
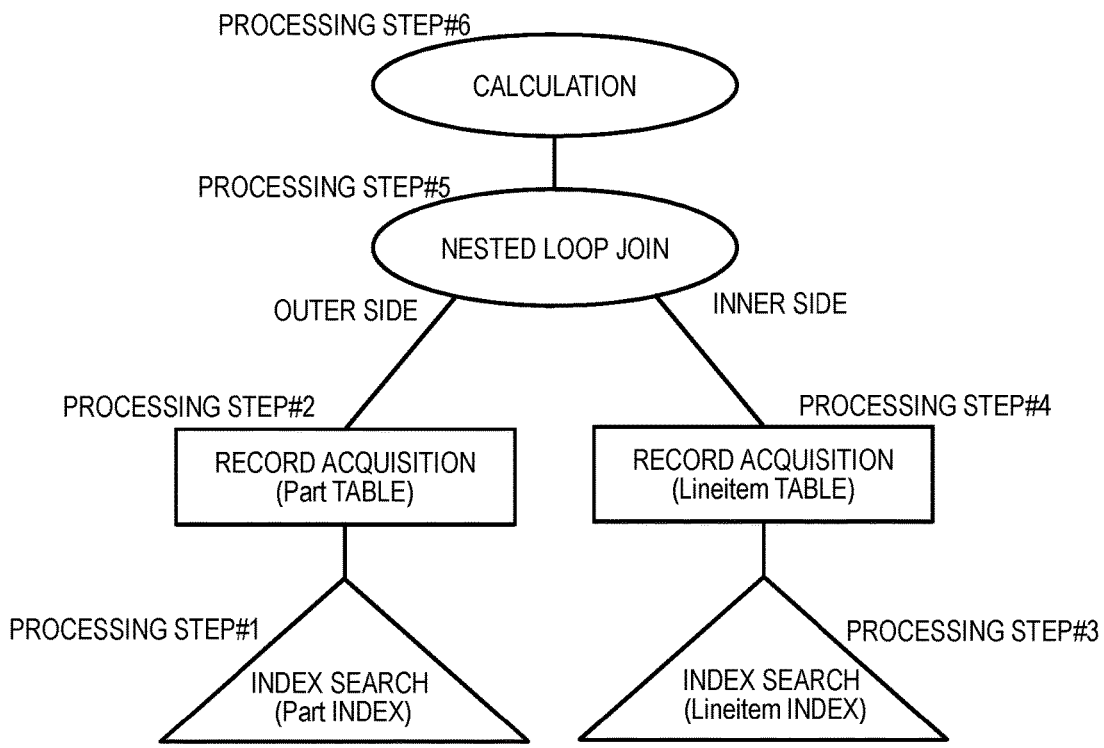
FIG. 11 is a diagram for illustrating an example of a query execution plan according to the first embodiment.
FIG. 12 is a diagram for showing an example of the cost table1 in which a CPU cost is set for each of the processing steps #1 to #6 illustrated in FIG. 11.

FIG. 11 is a diagram for illustrating an example of a query execution plan according to the first embodiment.

The query execution plan illustrated in FIG. 11 is an example of a query execution plan generated by the query execution plan generation module 143 when the DBMS 141 has received the query shown in FIG. 5.

The query execution plan corresponding to the query shown in FIG. 5 includes, as shown in FIG. 11, a processing step #1 for performing an index search based on the Part index 2041, a processing step #2 for acquiring a record from the Part table 2051, a processing step #3 for performing an index search based on the Lineitem index 2042, a processing step #4 for acquiring a record from the Lineitem table 2054, a processing step #5 for performing a nested loop join on the results, and a processing step #6 for executing a calculation on the result obtained by the nested loop join. The outer side of the diagram shows a nested outer loop, which in this embodiment is the processing performed on the Part table 2051. Further, the inner side of the diagram shows a nested inner loop, which in this embodiment is the processing performed on the Lineitem table 2054.

FIG. 12 is a diagram for showing an example of the cost table 1431 in which a CPU cost is set for each of the processing steps #1 to #6 illustrated in FIG. 11.

The cost table 1431 is managed on the memory 140 by the query execution plan generation module 143. In the cost table 1431, one entry is constructed from a processing step 1432 for storing a processing step number and a CPU cost 1433 for storing a cost on the processor 120.

The CPU cost 1433 for each of the processing steps #1 to #6 is represented as a numerical value based on the processing amount required by the processor 120 when executing the corresponding processing step. As the processing amount, for example, the number of commands in each processing step, the number of blocks required by the processor 120 to execute each processing step, the processing time required for the processing of each processing step, and the like, may be used. In this embodiment, an example is shown in which the CPU cost 1433 is represented based on processing time (microsecond) when each processing step 1432 is executed by the computer 100.

The query execution plan is determined by the query execution plan generation module 143 based on the CPU cost or the I/O cost of each processing step. Therefore, as the CPU cost, the CPU cost used as a cost estimate by the query execution plan generation module 143 may be used.

Further, the query execution plan generation module 143 may set a result obtained by measuring in advance the processing time of each processing step or the clock cycle required for the processing in the cost table 1431. In addition, the query execution plan generation module 143 may also detect the CPU cost during execution of the query, and set the detected value in the cost table 1431. Still further, the query execution plan generation module 143 may correct the detected CPU cost by using the processing time of the processing step during query execution.

Figure 13:
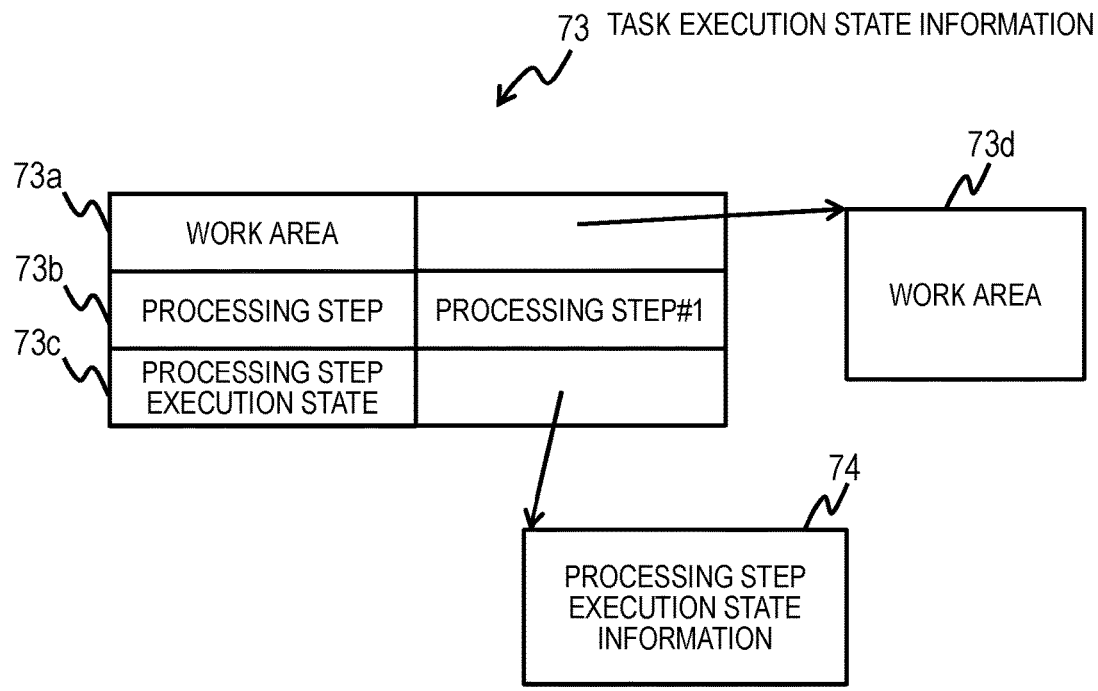
FIG. 13 is a diagram for showing an example of task execution state information according to the first embodiment.

FIG. 13 is a diagram for showing an example of task execution state information 73 according to the first embodiment. The task execution state information 73 is stored on the memory 140 by the execution task management module 145.

The task execution state information 73 includes a work area 73a set on the memory 140, a processing step 73b for storing the number of the processing step to be executed, and a processing step execution state 73c.

The work area 73a stores a pointer indicating a work area 73d for storing the column value when the corresponding task processes the query execution plan. The processing step 73b stores information, for example the processing step number, for identifying the processing step to be executed by the corresponding task. The processing step execution state 73c stores execution state information (processing step execution state information) 74 on the corresponding processing step. A specific example of the processing step execution state information 74 is described below.

Figure 14:
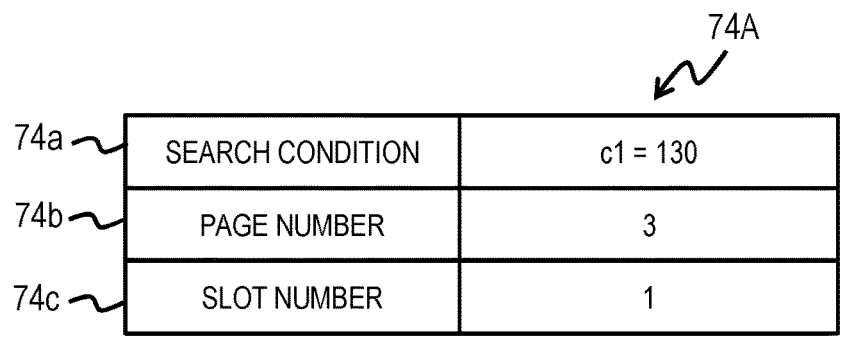
FIG. 14 is a diagram for showing a first example of the processing step execution state information according to the first embodiment.

FIG. 14 is a diagram for showing a first example of the processing step execution state information 74 according to the first embodiment. In FIG. 14, processing step execution state information on a task using a higher page in the index search is shown.

Processing step execution state information 74A includes a search condition 74a, a page number 74b, and a slot number 74c. The search condition 74a stores a search condition. In the example shown in FIG. 14, "c1=130", which is a search condition included in the query shown in FIG. 5, is stored in the search condition 74a. The page number 74b stores the number of the higher page (the page number) to be used in the processing of the task. The slot number 74c stores the number of the slot (the slot number) in the page to be used in the processing of the task.

Figures 15, 16, 17:
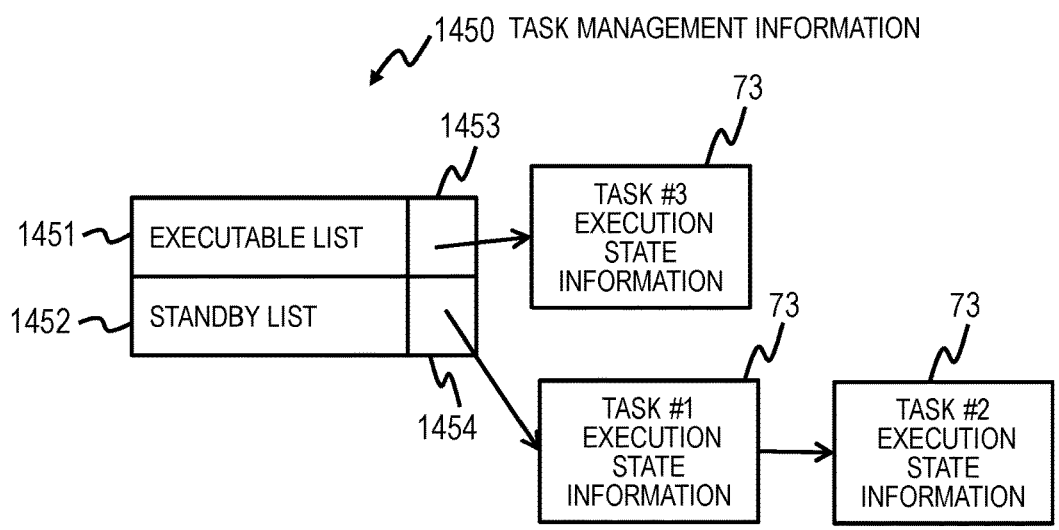
FIG. 15 is a diagram for showing a second example of the processing step execution state information according to the first embodiment.
FIG. 16 is a diagram for showing a third example of the processing step execution state information according to the first embodiment.
FIG. 17 is a diagram for showing an example of a data structure of task management information according to the first embodiment.

FIG. 15 is a diagram for showing a second example of the processing step execution state information 74 according to the first embodiment. In FIG. 15, processing step execution state information on a task using the leaf pages P4 to P9 in the index search is shown.

Processing step execution state information 74B includes a search condition 74d, a page number 74e, a slot number 74f, and a processing RowID number 74g. The search condition 74d stores a search condition. In the example shown in FIG. 15, "c1=130", which is the search condition, is stored in the search condition 74d. The page number 74e stores the page number "7" of the leaf page to be used in the processing of the task.

The slot number 74f stores the slot number "2" of the slot in the page to be used in the processing of the task. The processing RowID number 74g stores the ID number (processing RowID number) "1" of the Row in the slot to be used in the processing of the corresponding task.

FIG. 16 is a diagram for showing a third example of the processing step execution state information 74 according to the first embodiment. In FIG. 16, processing step execution state information 74C on a task for which a record is to be acquired is shown.

The processing step execution state information 74C includes a page number 74h and a slot number 74i. The page number 74h stores the page number "2" of the page to be used in the processing of the task. The slot number 74i stores the slot number "2" of the slot in the page to be used in the processing of the task.

FIG. 17 is a diagram for showing an example of a data structure of task management information 1450 according to the first embodiment. The task management information 1450, which has a data structure managed by the execution task management module 145, is stored in the memory 140.

The data structure of the task management information 1450 includes an executable list 1451 for managing executable tasks and a standby list 1452 for managing tasks that are in an execution-standby state, such as a task waiting for completion of an I/O request.

The executable list 1451 includes a pointer 1453 to the task execution state information 73 (shown in FIG. 13), which is execution state information on executable tasks. Similarly, the standby list 1452 also includes a pointer 1454 to the task execution state information 73 (shown in FIG. 13), which is execution state information on tasks that are on standby. Further, the task execution state information 73 includes a pointer to the task execution state information 73 on other executable tasks.

Figure 18:
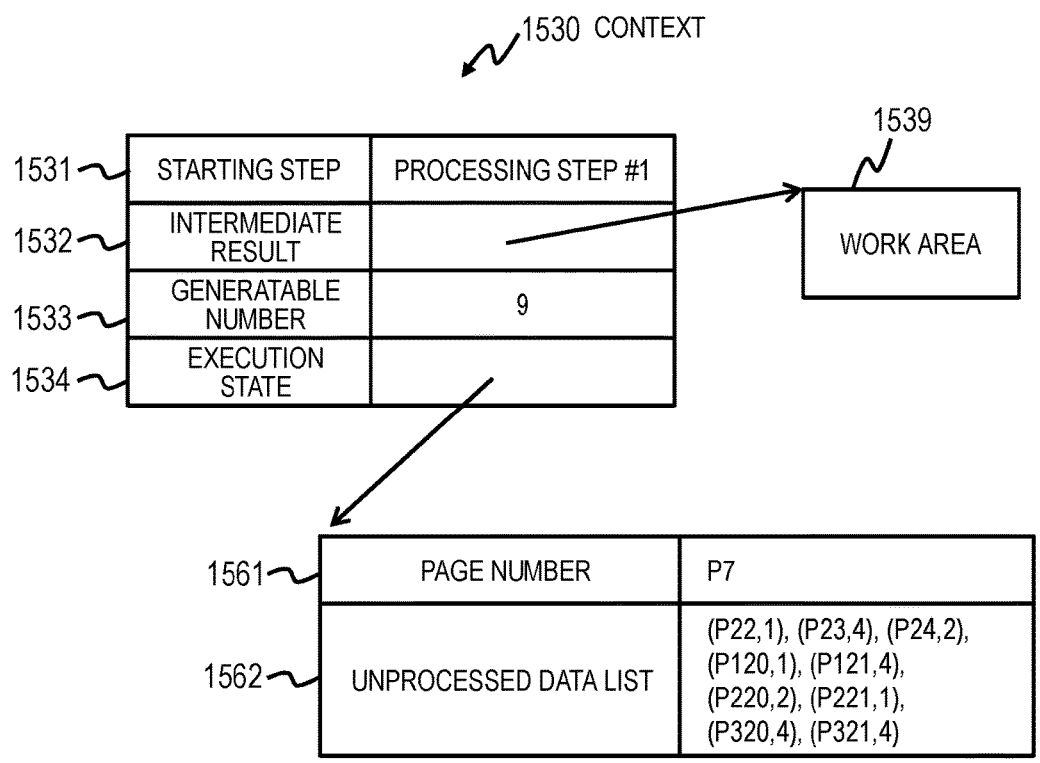
FIG. 18 is a diagram for showing an example of an initial context according to the first embodiment.

FIG. 18 is a diagram for showing an example of an initial context 1530. As described above, the context 1530, which is the information required to execute a newly generated task, is managed by the context management module 153.

As shown in FIG. 18, the initial context 1530 includes a starting step 1531, an intermediate result 1532, a generatable number 1533, and an execution state 1534. The starting step 1531 stores a number or an identifier of the processing step to be executed.

The intermediate result 1532 stores a pointer indicating a location of a work area 1539 for storing the intermediate result required for the task executing the processing step. In this case, the intermediate result is the required data that has been acquired in order to generate the query result. Further, the work area 1539 is an area set in the memory 140.

The execution state 1534 stores information for identifying the content of the processing to be executed next. For example, in the example shown in FIG. 18, the execution state 1534 stores a page number 1561 of the processing target and an unprocessed data list 1562 constructed from a list of data that has not yet been processed. The unprocessed data list 1562 can be constructed from, for example, pairs consisting of a page number and a slot number that have not been processed.

The generatable number 1533 stores the number of tasks (generatable task number) that can be further generated by the task generation control module 152. The generatable task number is the number of processes that have not been generated as tasks among processes that logically branch off in the page number of the execution state in the starting step 1531. In the example shown in FIG. 18, when searching in the Part index 2041 shown in FIG. 6 based on the search condition "c1=130", the context when the entry for "c1=130" is acquired for the page P7 is shown.

In the example shown in FIG. 18, "processing step #1" is stored in the starting step 1531. The intermediate result 1532 stores a pointer to the work area 1539, which is an area in which the content of the work area 73d storing the task when the context is generated has been copied.

As shown in FIG. 6, "P7", which is the page number of the leaf page to be used in the processing of the task generated from the context, is stored in the page number 1561. In this case, because the first RowID 20411="P21,2" shown in FIG. 7 is processed by the task for generating the context, the data of the remaining nine RowID 20411s is stored in the unprocessed data list 1562. There are nine generatable tasks from the initial context 1530, and hence "9" is stored in the generatable number 1533.

Figure 19:
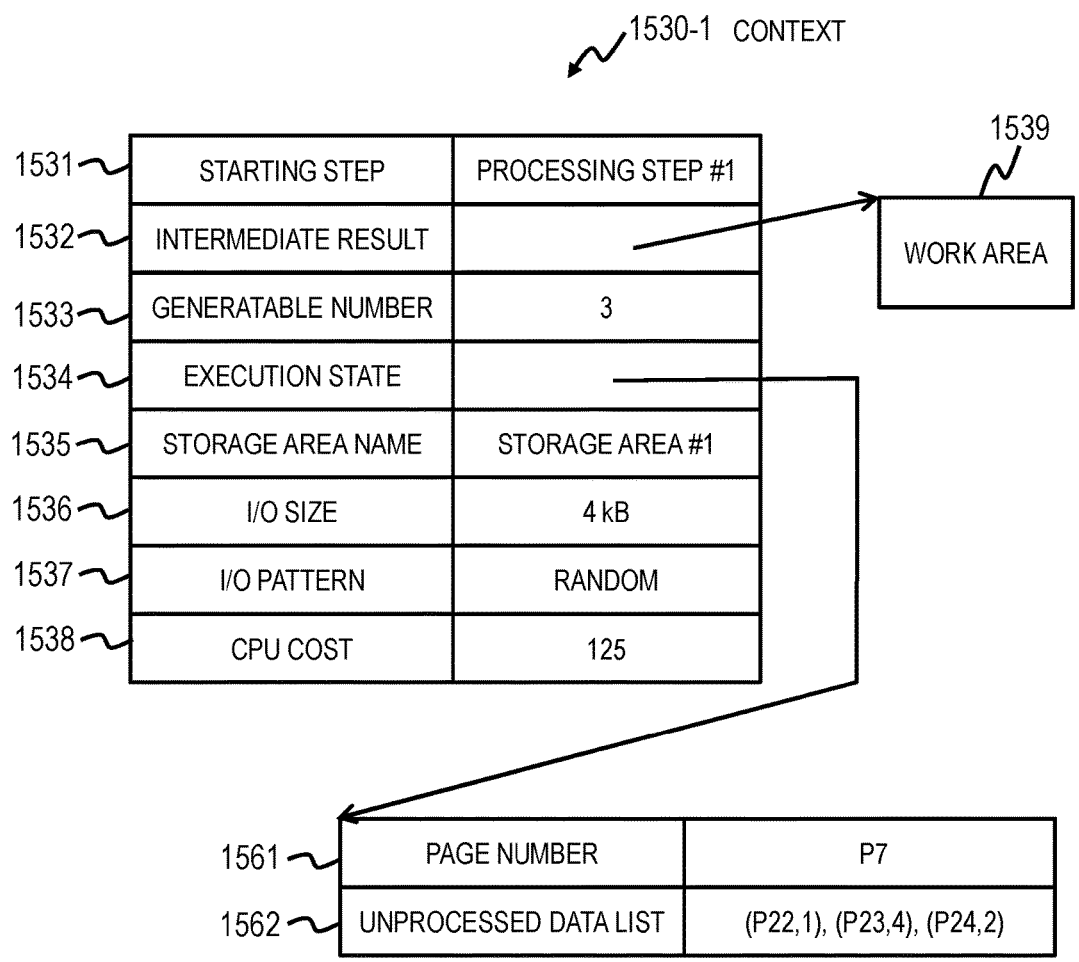
FIG. 19 is a diagram for showing an example of a first context according to the first embodiment.

FIG. 19 is a diagram for showing an example of a first context 1530-1 according to the first embodiment.

In this invention, in order to enable the task to be generated to be selected based on the utilization situation of the I/O resources and the CPU resources, contexts 1530-1 to 1530-n can be generated for each characteristic (or type) of the task to be generated. In this embodiment, examples of task characteristics include the storage areas #1 to #4 issuing the I/O request, an I/O size, which is the size of the I/O request, an I/O pattern, and the CPU cost. The I/O pattern is a characteristic of the addresses described in a plurality of I/O requests. For example, when an I/O request to an address adjacent to the address of the previous I/O request is processed consecutively, the I/O pattern is referred to as being "sequential". On the other hand, when an I/O request to an address that has no relationship with the address of the previous I/O request is processed consecutively, the I/O pattern is referred to as being "random". The I/O pattern as a task characteristic indicates what kind of characteristic the addresses of the I/O requests will have when the task is executed. Further, the DBMS 141 generates contexts 1530-1 to 1530-n for each characteristic classified from the initial context 1530.

As a result, the first context 1530-1 shown in FIG. 19 includes, in addition to the starting step 1531, the intermediate result 1532, and the generatable number 1533 shown in FIG. 18, a storage area name 1535, an I/O size 1536, an I/O pattern 1537, and a CPU cost 1538.

In FIG. 19, an example of the first context 1530-1 including the RowIDs for which the storage area #1 is accessed when the RowIDs 20411 (shown in FIG. 7) included in the initial context 1530 shown in FIG. 18 is classified is shown. The processing for classifying the context to be generated based on a characteristic is described in more detail later.

The task generated from the context 1530-1 accesses the storage area #1. The I/O size 1536 is 4 KB, the I/O pattern 1537 is random, and the CPU cost 1538 is 125 tasks.

Figure 20:
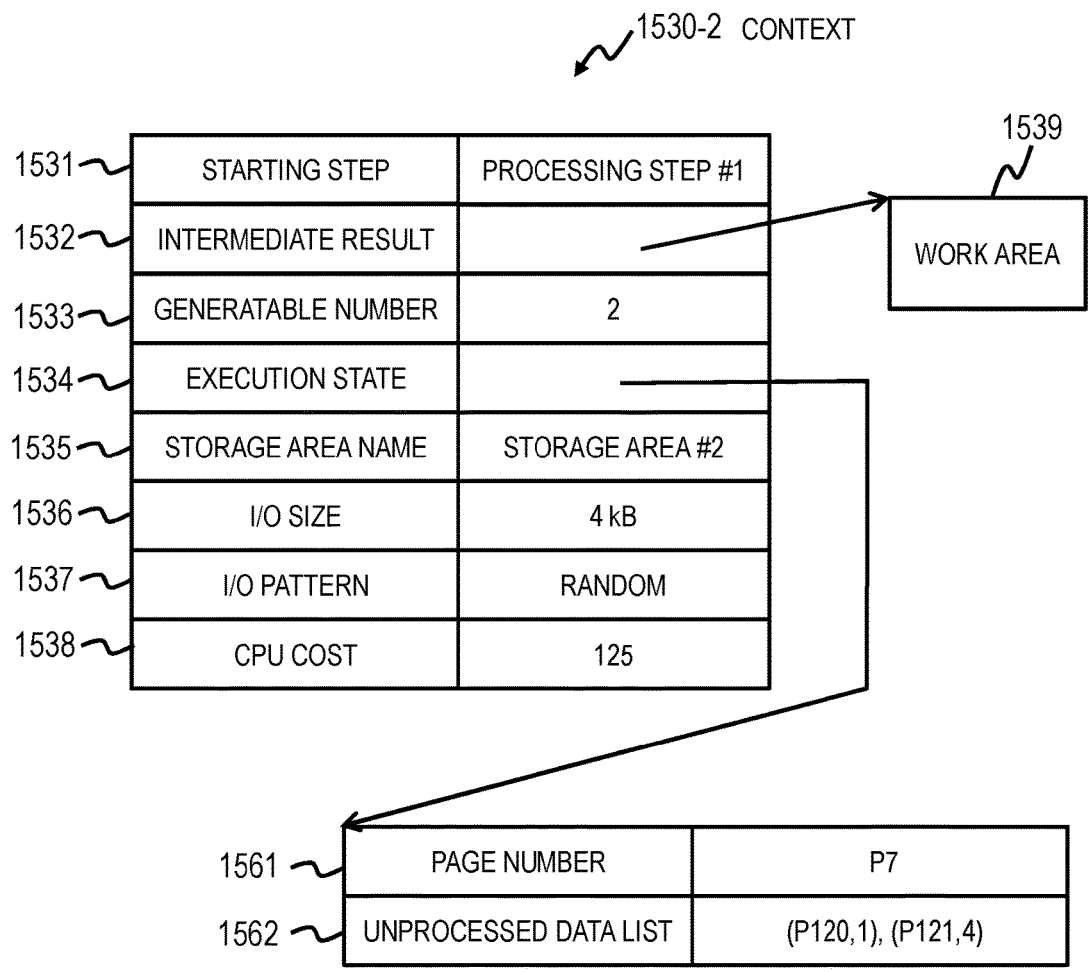
FIG. 20 is a diagram for showing an example of a second context according to the first embodiment.

FIG. 20 is a diagram for showing an example of a second context according to the first embodiment.

In FIG. 20, an example of the context 1530-2 including the RowIDs for which the storage area #2 is accessed when the RowIDs 20411 (shown in FIG. 7) included in the initial context 1530 shown in FIG. 18 is classified is shown. The task generated from the context 1530-2 accesses the storage area #2. The I/O size 1536 is 4 KB, the I/O pattern 1537 is random, and the CPU cost 1538 is 125 tasks.

It should be noted that in this embodiment context classification is carried out so that utilization of the I/O resources and the CPU resources can be differentiated. However, the contexts may also be classified based on utilization of the memory resources. For example, the amount of memory consumed by the task starting processing in the context may also be used as a characteristic.

Figure 21:
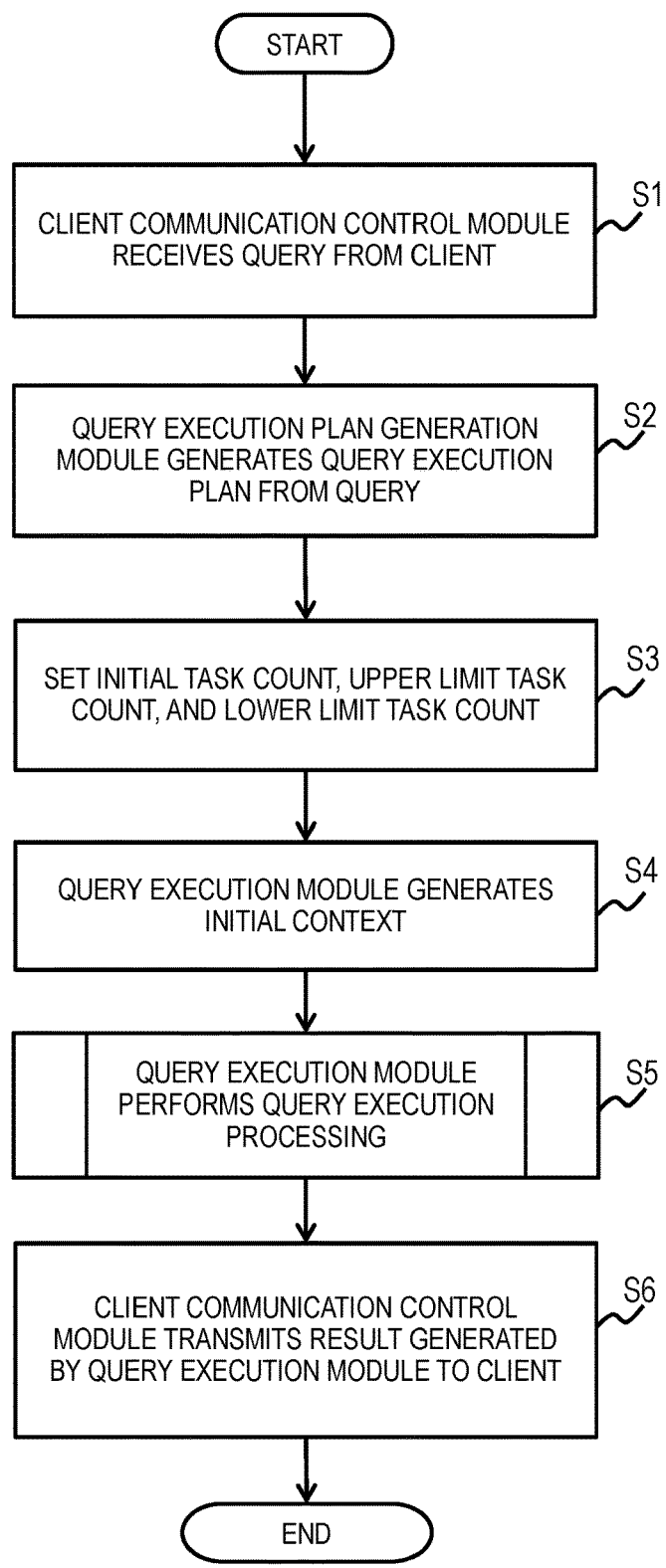
FIG. 21 is a flowchart of the overall processing from when the DBMS receives a query until a result is transmitted as a response according to the first embodiment.

FIG. 21 is a flowchart of the overall processing from when the DBMS 141 receives a query until a result is transmitted as a response according to the first embodiment.

In the processing performed when a query is received, when the client communication control module 142 receives a query from the AP 148 (Step S1), the client communication control module 142 passes the received query to the query execution plan generation module 143, and the query execution plan generation module 143 generates a query execution plan (Step S2).

Next, the query execution module 144 sets an initial task count, an upper limit task count, and a lower limit task count (Step S3). In this embodiment, the query execution module 144 sets the initial task count, the upper limit task count, and the lower limit task count. However, the query execution module 144 may set any one of those, or may arbitrarily combine the initial task count, the upper limit task count, and the lower limit task count.

In this case, the initial task count is the number of tasks generated by the query execution module 144 after query execution processing has started irrespective of the utilization situation of the CPU resources and the I/O resources. The initial task count may be specified by the user, or may be automatically calculated by the DBMS 141 based on the hardware configuration. For example, when the communication network 300 and the computer 100 are coupled together by a Fibre Channel, if a tag number, which is the number of I/O requests capable of being simultaneously issued by a Fibre Channel port, is 1024, the "number of Fibre Channel ports×1024" is set as the initial task count.

Alternatively, if the number of simultaneous command receptions of the external storage apparatus 200 is 2048, "2048" is set for the initial task count. When the external storage apparatus 200 provides a logical volume in the computer 100 using n-number of hard disk drives (HDDs), "n×32" is set for the initial task count.

The upper limit task count is the upper limit of the count of tasks that can simultaneously be on the DBMS 141. The upper limit task count ensures that the number of tasks simultaneously on the DBMS 141 does not exceed the upper limit count even when the CPU resources and the I/O resources are not being sufficiently utilized. The upper limit task count may be specified by the user, or may be automatically calculated by the DBMS 141 based on the hardware configuration. For example, when the communication network 300 and the computer 100 are coupled together by a Fibre Channel, if a tag number, which is the number of I/O requests capable of being simultaneously issued by a Fibre Channel port, is 1024, the "number of Fibre Channel ports×1024" is set as the upper limit task count. When the number of simultaneous command receptions of the external storage apparatus 200 is 2048, "2048" is set for the upper limit task count. When the external storage apparatus 200 provides a logical volume in the computer 100 using n-number of hard disk drives (HDDs), "n×32" is set for the upper limit task count.

The lower limit task count is the number of tasks to be generated regardless of the utilization situation of the CPU resources and the I/O resources. The lower limit task count may be specified by the user, or may be automatically calculated by the DBMS 141 based on the hardware configuration. For example, the number of processor cores may be set as the lower limit task count so that the processor cores can be utilized. Further, the number of HDDs may be set as the lower limit task count so that the HDDs of the external storage apparatus 200 can be utilized.

Next, the query execution module 144 generates the initial context 1530 (Step S4). The initial context 1530 is, as shown in FIG. 18, the context 1530 for generating the task that first executes the query execution plan. For example, in the case of the query execution plan illustrated in FIG. 11, the initial context 1530 is the context for starting the processing step #1 based on the search condition "c1=130" from the root page of the Part index. The generated initial context 1530 is registered in the context management module 153.

The query execution module 144 performs query execution processing (Step S5). The query execution module 144 generates a new task, processes the query by executing the task, and generates a query result for the DB 206 of the external storage apparatus 200. The specific details of the query execution processing are described with reference to FIG. 22.

The client communication control module 142 transmits the result generated by the query execution module 144 as a response to the AP 148 that transmitted the query (Step S6). When all of the results generated by the query execution module 144 have been transmitted, the overall processing finishes.

In the processing described above, the DBMS 141 receives a query from the AP 148, generates a task corresponding to the query, executes the task to access the DB 206 of the external storage apparatus 200, and generates an access result as a query processing result.

Figure 22:
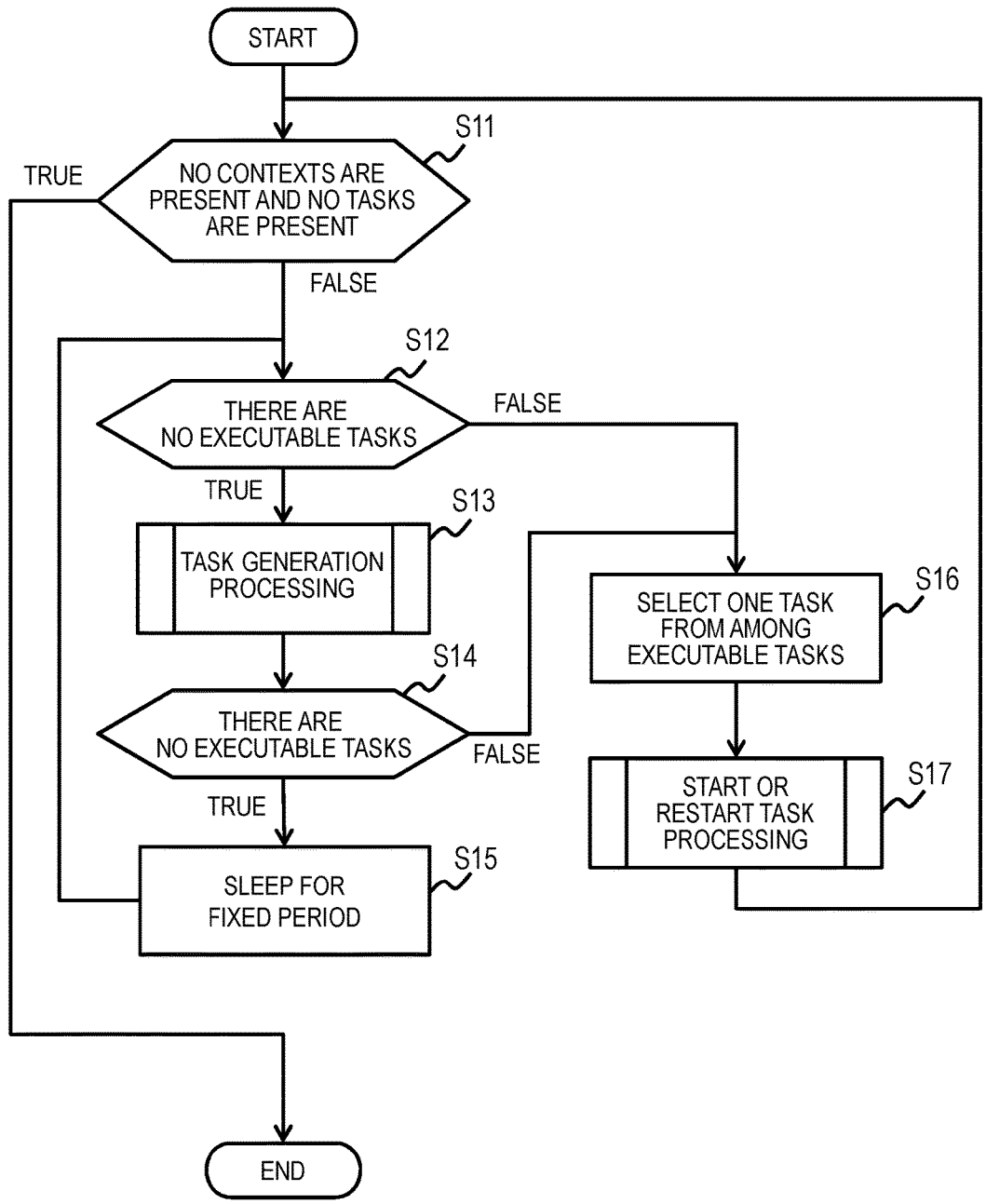
FIG. 22 is a flowchart for illustrating an example of the query execution processing according to the first embodiment.

FIG. 22 is a flowchart for illustrating an example of the query execution processing according to the first embodiment. This processing is the processing performed in Step S5 of FIG. 21.

The query execution module 144 determines whether or not the context 1530 is present and whether or not a task is present (Step S11). Whether or not the context 1530 is present is determined based on whether or not there is the context 1530 registered in the context management module 153. Whether or not a task is present is determined based on whether or not a task is present in the execution task management module 145. When the context 1530 is not present, and, when there is no task present, the query execution processing finishes. On the other hand, when the context 1530 is present, or, when a task is present, the processing proceeds to S12.

The query execution module 144 determines whether or not an executable task is present (Step S12). Whether or not an executable task is present is determined by the execution task management module 145. When an executable task is not present, the processing proceeds to S13, and when an executable task is present, the processing proceeds to S16.

When there is no executable task present, the query execution module 144 performs task generation processing (Step S13). The task generation processing is processing for reading the context 1530 and generating a new task. The specific processing performed in this step is described later.

After the task generation processing, the query execution module 144 determines whether or not an executable task is present again (Step S14). When an executable task is not present, this means that there is no context and that all of the tasks that exist are stored in the pointer 1454 (shown in FIG. 17) of the standby list 1452. Therefore, the processing sleeps for a fixed period (Step S15).

On the other hand, in Step S12 or Step S14, when an executable task is present, the query execution module 144 selects one task (Step S16), and executes the selected task (Step S17). The expression "executes the task" refers to starting the task execution processing illustrated in FIG. 23 when the task is a new one. On the other hand, for a task moved to the executable list from the pointer 1454 of the standby list 1452, processing is restarted from the point at which the task was placed in the pointer 1454 of the standby list 1452.

When execution of a new or a restarted task is finished, the processing returns to S11, and the query execution module 144 repeats the processing described above until the context 1530 and all of the tasks have been processed.

Figure 23:
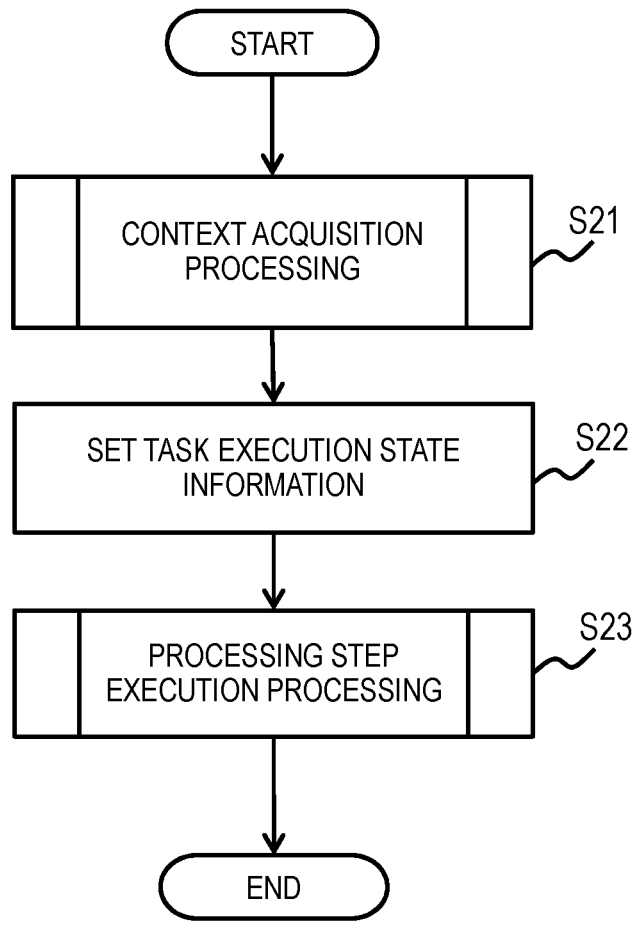
FIG. 23 is a flowchart for illustrating an example of the task execution processing according to the first embodiment.

FIG. 23 is a flowchart for illustrating an example of the task execution processing according to the first embodiment. This processing is the processing performed for a new task in Step S17 of FIG. 22.

The task execution processing is carried out when the query execution module 144 executes a new task for which processing has not been determined. In order to determine the processing content of the new task, the query execution module 144 performs context acquisition processing with the context management module 153 (Step S21). The specific details of the context acquisition processing are described with reference to FIG. 31.

The query execution module 144 sets the task execution state information 73 (shown in FIG. 13) of the task by using the acquired context 1530 (Step S22). In this case, the first context 1530-1 shown in FIG. 19 is described as an example. The query execution module 144 copies the value (processing step #1) of the starting step 1531 of the first context 1530-1 to the processing step 73*b* of the task execution state information 73.

The query execution module 144 copies the data of the work area 1539 indicated by the pointer of the intermediate result 1532 of the context 1530 to the work area indicated by the pointer of the work area 73*a* of the task execution state information 73.

The query execution module 144 sets the processing step execution state information 74C by extracting one piece of data from the unprocessed data list 1562 of the acquired context 1530. Because the query execution module 144 extracted one piece of data from the unprocessed data list 1562, the query execution module 144 decrements the generatable number 1533 of the context 1530 by one.

A specific example of setting the processing step execution state information 74C is now described. For example, when the query execution module 144 has acquired the RowID (P22,1) shown in FIG. 7 from the unprocessed data list 1562, as shown in FIG. 18, because the page number of the execution state of the context 1530 is "P7", the data of the unprocessed data list 1562 is the RowID for which a record is to be acquired.

Therefore, the query execution module 144 prepares the processing step execution state information 74C shown in FIG. 16, which is a step execution state for which a record is to be acquired. In other words, the query execution module 144 sets "P22" in the page number 74*h* of the processing step execution state information 74C, and "1" in the slot number 74*i*.

In order to execute the processing from record acquisition when starting the task, the query execution module 144 advances the processing step 73*b* in the task execution state information 73 by one, and sets the processing step #2 as illustrated in FIG. 11. As a result, the query execution module 144 completes the processing for setting the task execution state information 73.

The query execution module 144 executes processing step execution processing based on the state set in Step S22 (Step S23). The processing step execution processing is described below with reference to FIG. 24. When the processing step execution processing is finished, the task execution processing is finished.

Figure 24:
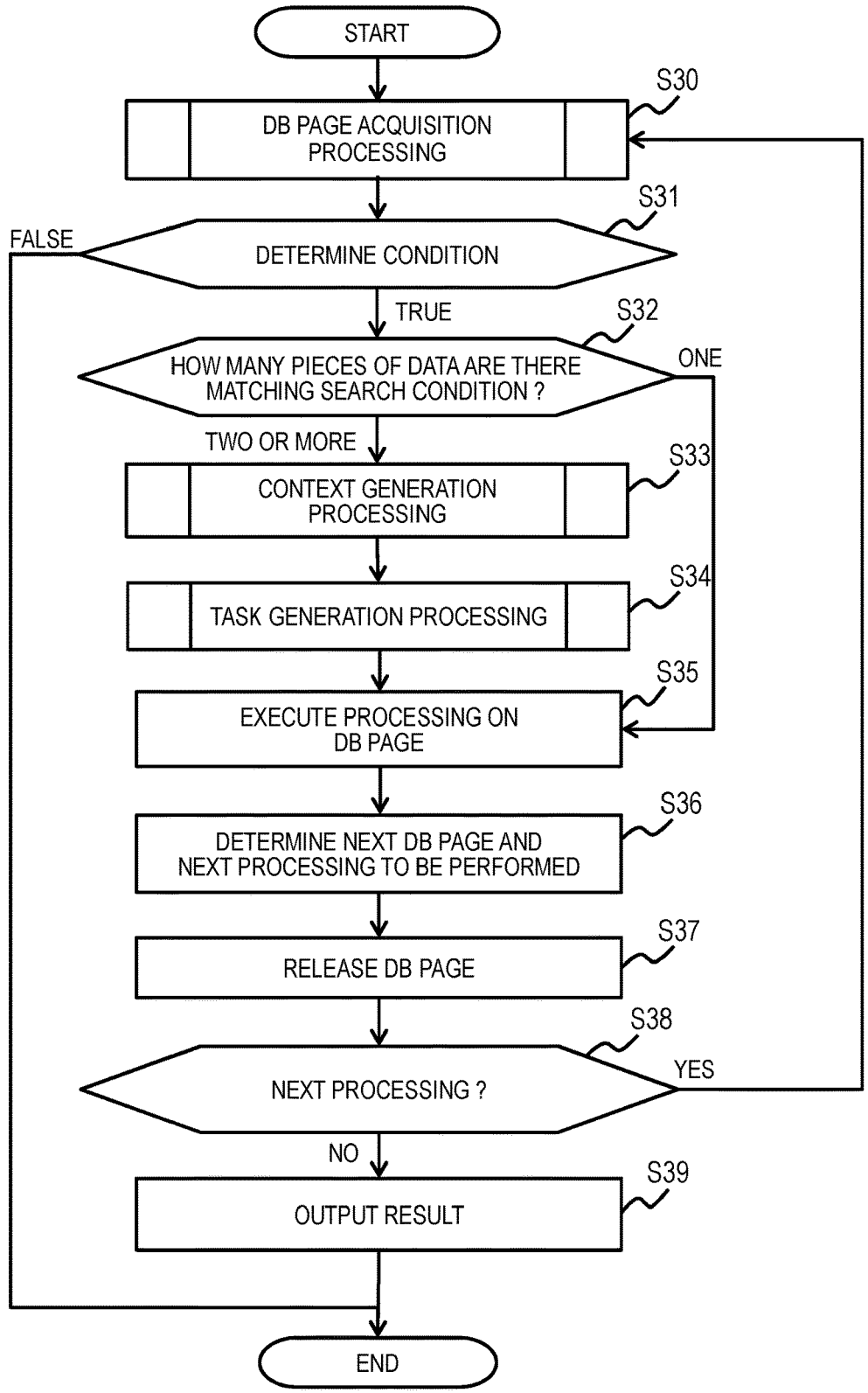
FIG. 24 is a flowchart for illustrating processing step execution state processing according to the first embodiment.

FIG. 24 is a flowchart for illustrating processing step execution state processing according to the first embodiment. This processing is the processing executed in Step S23 of FIG. 23.

The query execution module 144 acquires the target page (DB page) of the query from the DB 206 by the DB buffer management module 146 executing DB page acquisition processing (illustrated in FIG. 26) (Step S30).

Next, the query execution module 144 determines whether or not there is a match in the data of the acquired page with the search condition (Step S31). An example of such a match is, for a higher page of an index, search processing in a higher page, and for a leaf page, search processing in a leaf page. When it is determined that there is no data matching the search condition in the data in the page ("FALSE" in Step S31), the processing step execution processing finishes.

On the other hand, when it is determined that there is data matching the search condition ("TRUE" in Step S31), the query execution module 144 determines whether or not there is one piece of data matching the search condition, or two or more pieces of data matching the search condition (Step S32).

When it is determined that there is one piece of data matching the search condition ("ONE" in Step S32), the query execution module 144 advances the processing to S35. On the other hand, when it is determined that there are two or more pieces of data matching the search condition ("TWO OR MORE" in Step S32), the query execution module 144 performs context generation processing (illustrated in FIG. 25) (Step S33). The task generation control module 152 of the query execution module 144 then executes task generation processing (illustrated in FIG. 29) (Step S34), and the processing proceeds to S35.

In Step S35, the query execution module 144 executes processing of the processing step on the page in the DB 206 based on the task. In this case, the processing that is performed on the page in the DB 206 is, for example, for a higher page of an index, reading the page number matching the search condition, for a leaf page, reading the RowID matching the search condition, and for a page in the table 205, reading the column of the record.

Next, the query execution module 144 determines the next page in the DB 206 and the processing to be performed on that page (Step S36), and then the processing proceeds to S37.

In Step S37, because the processing has finished, the query execution module 144 releases the acquired page in the DB 206. Next, in Step S38, the query execution module 144 determines whether or not there is any more processing to be carried out. Specifically, when the processing step 73b currently being carried out is completed, and there are no more processing steps in the processing block including that processing step, the query execution module 144 determines that there is no more processing to be carried out.

When it is determined that those is more processing to be carried out ("YES" in Step S38), the query execution module 144 returns the processing to Step S30. On the other hand, when it is determined that there is no more processing to be carried out ("NO" in Step S38), the processing result is passed to the query execution module 144 (Step S39), and the processing step execution processing finishes.

An example is now described regarding how the next page is acquired from the DB 206 and how the processing to be carried out on that page is determined. In the following example, an index search is carried out for the Part index 2041 on the DB 206 shown in FIG. 2 to FIG. 4 and FIG. 6 to FIG. 8 based on "c1=130" as the search condition.

When first starting the index search, the query execution module 144 starts the processing by determining the index root page (the page denoted by the page number "P1" shown in FIG. 6) to be the next page in the DB 206, and determining search processing among the higher pages to search for the key "130" in those pages as the processing to be carried out on the pages in the DB 206.

In Step S30, the query execution module 144 reads the page P1, and in Step S31, searches for an entry containing "130" in the column c1 (2052) in the page P1. In FIG. 6, the query execution module 144 acquires one entry (Pt 13) containing "200" in the column c1 (2052). Hence, in Step S35 and Step S36, the query execution module 144 determines that the next processing to be carried out is to be search processing on the pages in the DB 206 for page P3 among the lower level pages.

Further, in Step S30 to Step S35, processing is carried out on the lower page P3 of the index. The query execution module 144 reads the page P3 from the DB 206, searches for an entry containing "130" in the column c1 (2052) in the page P3, and acquires the pointer Pt to the page P7 in the entry containing "130" in the column c1 (2052). As a result, the query execution module 144 determines that the page P7 is to be the next page to be processed in the DB 206, and determines that search processing among the leaf pages for the page P7 is to be the processing to be carried out on the pages in the DB 206.

In Step S30 to Step S33, the query execution module 144 reads the page P7, and as shown in FIG. 6, acquires an entry (E72) containing "130" in the column c1 (2052) on the page P7. As shown in FIG. 7, because there are ten pieces of data matching the search condition, in order to process the nine pieces of data other than the data to be processed by this task, the query execution module 144 performs context generation processing (Step S33) and task generation processing (Step S34).

In this embodiment, the data to be processed by the task is the initial data. In Step S36, the page P21 in the Part table 2051 is determined to be the next target page in the DB 206, and as shown in FIG. 8, processing for acquiring the record in the slot number 2 for the page P21 is determined to be the processing to be carried out on the pages in the DB 206.

Based on the processing described above, in the DBMS 141, the context 1530 for processing the data matching the search condition can be generated from the top processing target page in the DB 206 as shown in FIG. 18, and executed as a plurality of tasks by generating tasks from this context 1530.

Figure 25:
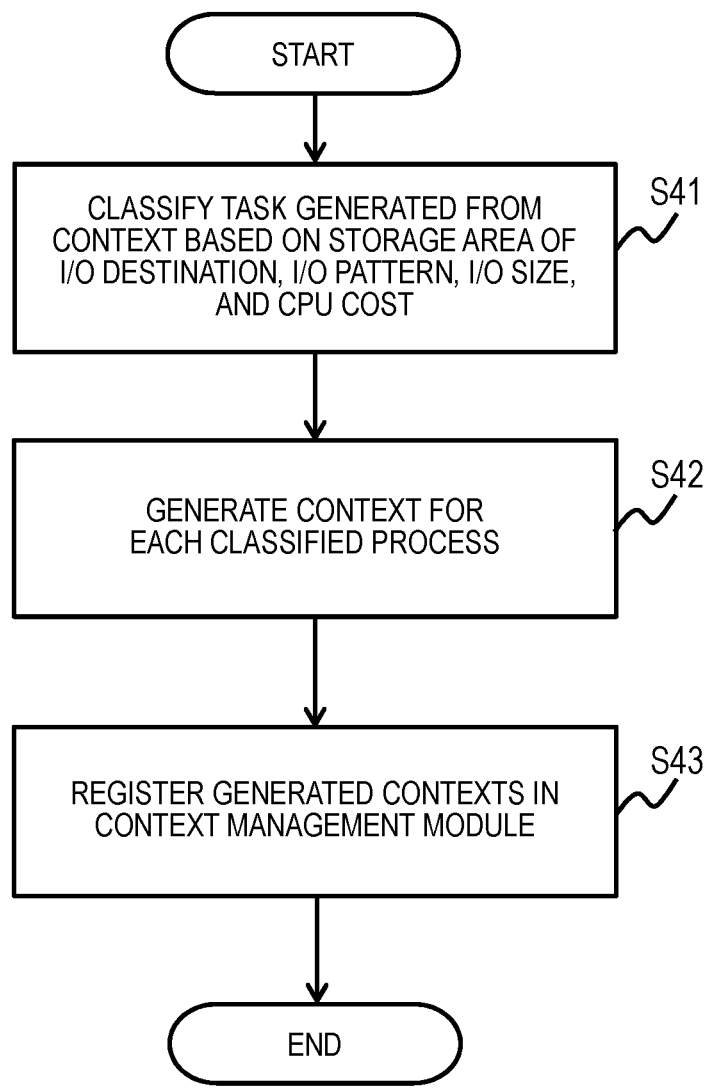
FIG. 25 is a flowchart for illustrating the context generation processing according to the first embodiment.

FIG. 25 is a flowchart for illustrating the context generation processing according to the first embodiment. This processing is the processing executed in Step S33 of FIG. 24.

First, the query execution module 144 classifies the task generated from the initial context 1530 shown in FIG. 18 based on the storage areas #1 to #4 issuing the I/O request, the I/O pattern, the I/O size, and the CPU cost (Step S41).

For example, the task generated from the context 1530 generated by the processing of the leaf pages (P4 onwards) is generated based on the RowID stored in the unprocessed data list 1562 of the context 1530. The query execution module 144 classifies the RowID stored in the context based on the storage area name issuing the I/O request, the I/O size, which is the size of the I/O request, the I/O pattern, and the CPU cost, and generates a piece of context 1530-1 to 1530-n for each classified unprocessed data list 1562.

For example, for the RowID (P22,1) included in the unprocessed data list 1562 shown in FIG. 18, the query execution module 144 issues the I/O request to the storage area #1 by referring to the DB area management table 147 shown in FIG. 10.

Further, because the query execution module 144 processes the I/O request of the processing step #1 from the DB area management table 147 as processing from a leaf page, the I/O size 1536 is the page size of the DB 206 (in this example, the size is assumed to be 4 KB), and the I/O pattern 1537 is random.

In addition, the query execution module 144 acquires the CPU cost by referring to the cost table 1431 shown in FIG. 12. Because the task generated from the initial context 1530 may be carried out from any of the processing step #1 to the processing step #6, the query execution module 144 calculates the CPU cost 1538 of the initial context 1530 to be 125 by adding up all the CPU costs 1433 in the cost table 1431. The query execution module 144 also executes this processing on the remaining RowIDs 20411 shown in FIG. 7, and classifies the task generated based on the storage area #, the I/O size, the I/O pattern, and the CPU cost based on the type of resources to be utilized.

Further, the query execution module 144 generates a piece of context 1530-1 to 1530-n for each of the above-mentioned classes (Step S42), and registers the generated contexts 1530-1 to 1530-n in the context management module 153 (Step S43).

In the case of the context 1530 shown in FIG. 18, in this embodiment, the first context 1530-1 (FIG. 19) accessing the storage area #1 and a second context 1530-2 (FIG. 20) accessing the storage area #2, and a third context (not shown) accessing the storage area #3 and a fourth context (not shown) accessing the storage area #4, are generated.

Figure 26:
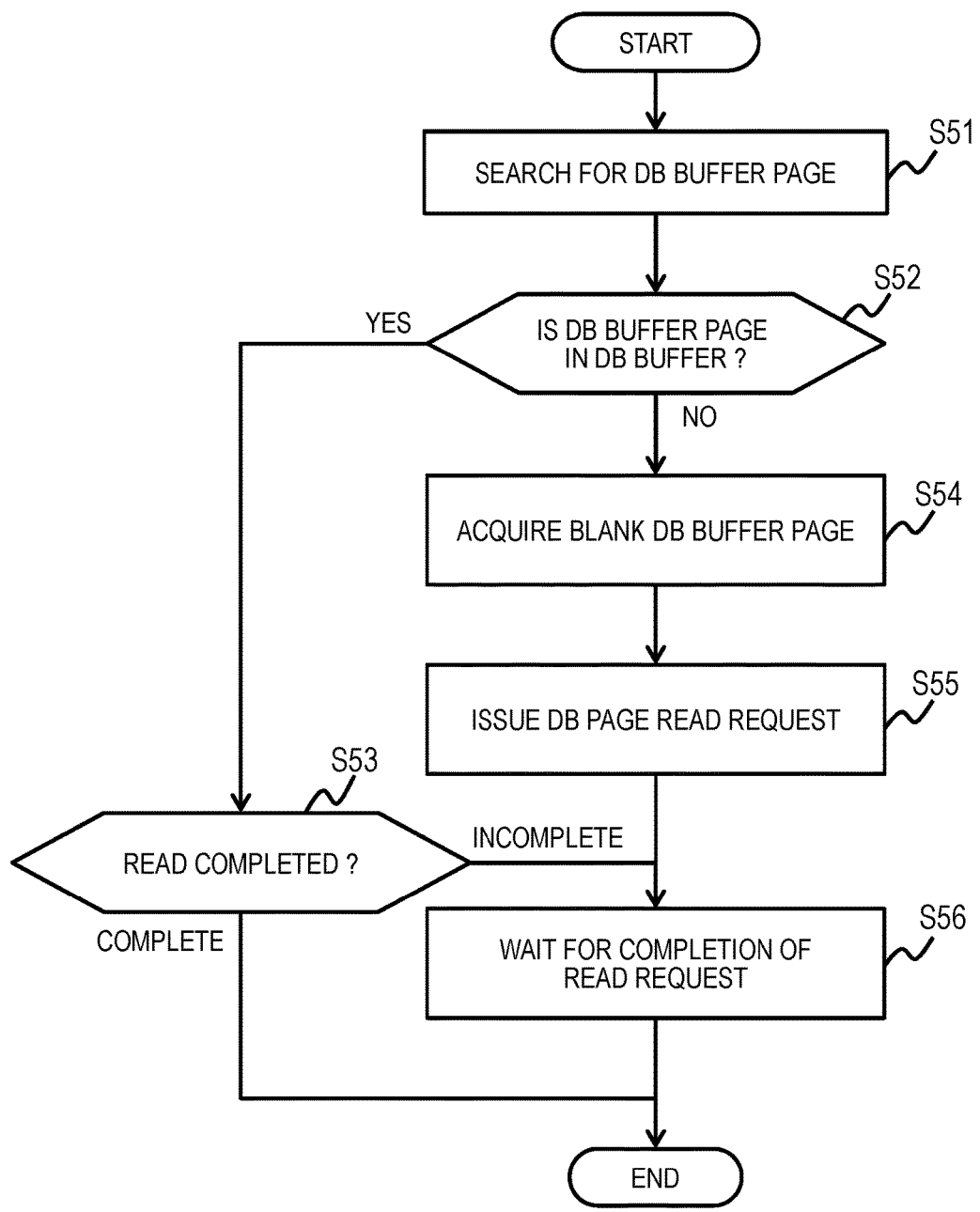
FIG. 26 is a flowchart for illustrating the DB page acquisition processing according to the first embodiment.

FIG. 26 is a flowchart for illustrating the DB page acquisition processing according to the first embodiment. This processing is a flowchart for illustrating an example of the processing performed in Step S30 of FIG. 24.

The DB buffer management module 146 searches for the buffer page (the page stored in the DB buffer 1460) corresponding to the page in the DB 206 to be acquired (Step S51), and determines whether or not the DB buffer page corresponding to the page in the DB 206 to be acquired is in the DB buffer 1460 (Step S52).

When the DB buffer management module 146 determines that the DB buffer page is in the DB buffer 1460 ("YES" in Step S52), the DB buffer management module 146 determines whether or not reading of the page from the DB 206 is complete (Step S53). When reading of the page from the external storage apparatus 200 is complete ("COMPLETE" in Step S53), the DB buffer management module 146 finishes the DB page acquisition processing. On the other hand, when reading of the page from the DB 206 is not complete ("INCOMPLETE" in Step S53), the processing proceeds to Step S56.

Further, when it is determined in Step S52 that the DB buffer page corresponding to the page to be acquired in the DB 206 is not in the DB buffer 1460 ("NO" in Step S52), the DB buffer management module 146 acquires a blank BD buffer page from the DB buffer 1460 (Step S54). Then, the DB buffer management module 146 issues a page read request to the DB 206 for reading the page to be acquired to the blank DB buffer page (Step S55), and the processing proceeds to Step S56. As a result, the page to be acquired is read from the DB 206 to the blank DB buffer page acquired from the DB buffer 1460.

In Step S56, the DB buffer management module 146 waits for reading of the page from the DB 206 to be completed. In this case, the DB buffer management module 146 can employ any one of synchronous I/O, which waits until reading of the page is complete, and asynchronous I/O, which executes other processing without waiting until reading of the page is complete.

For example, the DB buffer management module 146 interrupts the task processing being executed, enters a standby state, and migrates the task execution state information 73 to the standby list 1452. Then, the DB buffer management module 146 determines whether or not reading by another task of the page to be acquired is complete. When it is determined that reading by another task of the page to be acquired is complete, the DB buffer management module 146 may migrate the task execution state information 73 on the task to the executable list 1451, and restart the processing of the task.

Thus, when asynchronous I/O is employed, the DB buffer management module 146 can execute another task without waiting for reading of the page to be complete, which enables the processing capability of the DBMS 141 to be improved. It should be noted that when reading of the page from the DB 206 is complete, the DB buffer management module 146 finishes the DB page acquisition processing.

FIG. 27 is a diagram for showing an example of a system performance threshold table according to the first embodiment.

The system performance threshold table 154 stores thresholds for determining whether or not utilization of the CPU resources and the I/O resources is sufficient. The CPU resources threshold is a CPU usage 1541, which is the usage of all of the processors installed in the computer 100. The I/O resources threshold is a disk transfer rate 1542 (units: MB/s), which is the data transfer amount per unit time from the external storage apparatus 200, and an IOPS 1543 (units: IOPS), which is the I/O request processing number per unit time for the external storage apparatus 200. Further, for a system including a plurality of computers, a packet transfer rate 1544 (units: pps (packets per second)), which is the number of packets transmitted and received per unit time to and from another computer, may also be added to the I/O resources threshold. In this embodiment, although the packet transfer rate is used for the I/O resources of communication to/from another computer, a network transfer rate (units: MB/s), which is the data transfer amount with the another computer, may be used instead of the packet transfer rate.

The thresholds in the system performance threshold table 154 may be user-specified values, or may be automatically calculated by the DBMS 141 based on configuration of the computer system. Further, the threshold values may also be determined by executing a text query for measuring performance, by performing simple CPU processing, or by performing a simple random READ or a sequential READ.

In the example shown in FIG. 27, when the CPU usage 1541 is equal to or more than the threshold of 90%, utilization of the CPU resources is determined as being sufficient. On the other hand, when the disk transfer rate 1542 is equal to or more than the threshold of 2000 MB/s, or when the IOPS 1543 is equal to or more than the threshold of 60000 IOPS, utilization of the I/O resources is determined as being sufficient. It should be noted that in the first embodiment, because there is only one computer 100, the packet transfer rate 1544 is not considered. As a result, "−1" is set for the packet transfer rate 1544.

FIG. 28 is a diagram for showing an example of the performance data table 155 according to the first embodiment.

The performance data table 155 stores the current values of the performance data corresponding to the thresholds registered in the system performance threshold table 154. The performance data table 155 includes a CPU usage 1551, which is a usage of all of the processors installed in the computer 100 as performance data on the CPU resources. Further, the performance data table 155 includes, as performance data on the I/O resources, a disk transfer rate 1552, which is the data transfer amount per unit time from the external storage apparatus 200, and an IOPS 1553, which is the I/O request processing number per unit time of the external storage apparatus 200.

Further, for a computer system including a plurality of computers 100, the performance data table 155 also includes a packet transfer rate 1554, which is the data transfer amount with another computer. Those values may be calculated each time the DBMS 141 stores a CPU utilization time and an I/O command history, and refers to the performance data table 155. Further, a method may be used in which the DBMS 141 stores the CPU utilization time and the I/O command history, and updates the values in the performance data table 155 at a fixed interval. Further, the values calculated from the values output at a fixed interval based on a command (a mpstat command or an iostat command) from the OS running on the computer 100 may also be set in the performance data table 155.

It should be noted that each value in the performance data table 155 may be a value acquired at a predetermined cycle by the DBMS 141 or the OS (not shown) of the computer 100.

Figure 29:
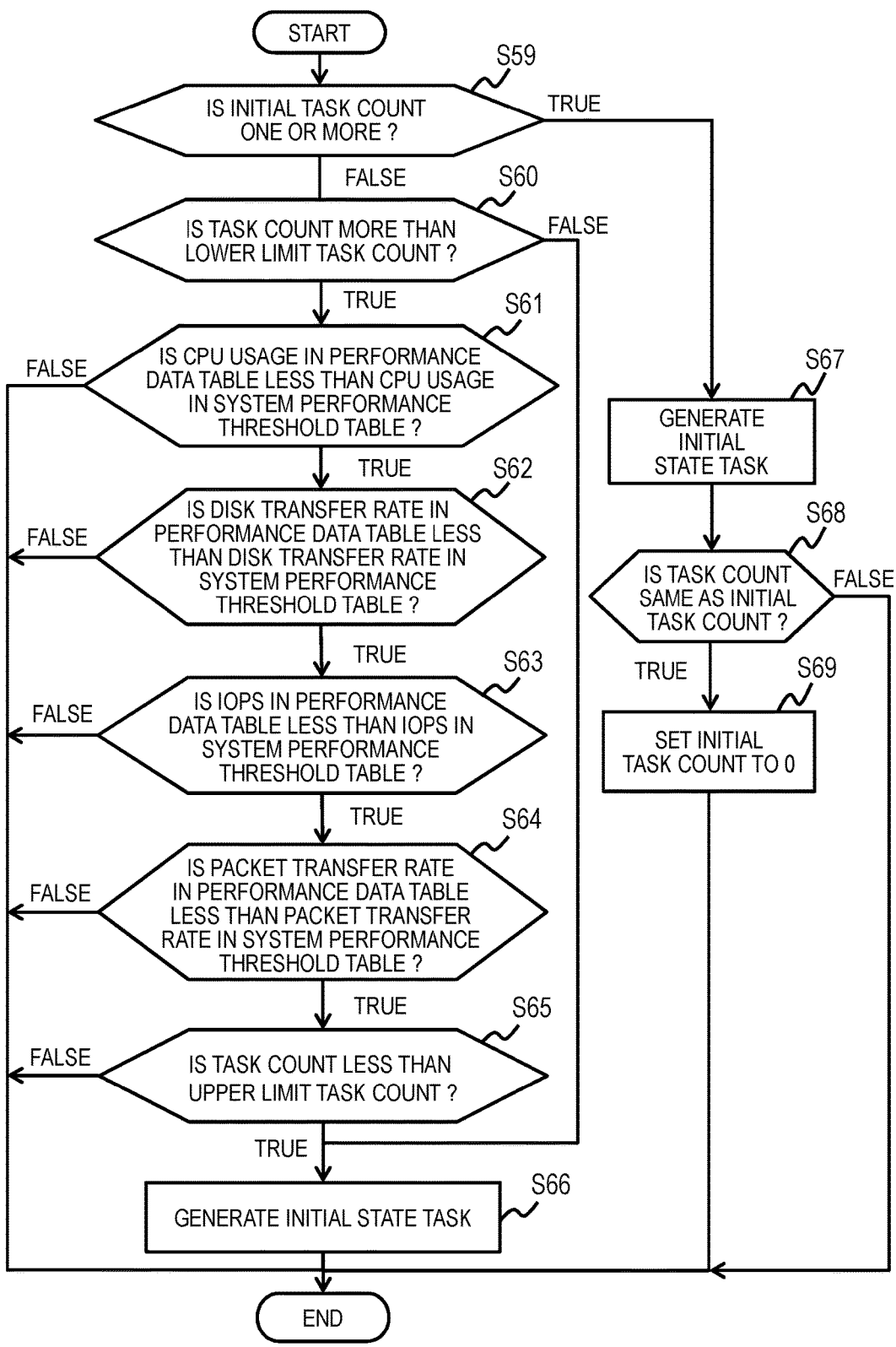
FIG. 29 is a flowchart of task generation processing according to the first embodiment.

FIG. 29 is a flowchart of task generation processing according to the first embodiment. This processing is executed by the task generation control module 152 of the query execution module 144 in Step S34 of FIG. 24.

In the task generation processing, the task generation control module 152 adjusts the generation of tasks based on the utilization situation of the CPU resources and the I/O resources. Further, the task generation control module 152 adjusts the task count based on the initial task count and the upper limit task count or the lower limit task count set by the query execution module 144 in Step S3 of FIG. 21. The task count is the number of tasks at that point in the execution task management module 145.

The task generation control module 152 determines whether or not the initial task count is one or more (Step S59), and when the initial task count is one or more, generates an initial state task (Step S67). In this processing, the task generation control module 152 compares the task count with the initial task count (Step S68), and when the task count is the same as the initial task count, sets the initial task count to zero (Step S69). On the other hand, when the task count is different from the initial task count, the task generation processing finishes. As a result, the task generation control module 152 can increase the task count up to the initial task count regardless of the utilization situation of the CPU resources and the I/O resources.

When the initial task count is not one or more ("FALSE" in Step S59), the task generation control module 152 compares the task count with the lower limit task count (Step S60). When the task count is equal to or less than the lower limit task count, the task generation control module 152 generates an initial state task (Step S66).

When the task count is more than the lower limit task count ("TRUE" in Step S60), the task generation control module 152 determines whether or not to generate the initial task based on the utilization situation of the CPU resources and the I/O resources. Specifically, the task generation control module 152 determines whether or not the CPU usage 1551 in the performance data table 155 is less than the CPU usage 1541 in the system performance threshold table 154 (Step S61). When the CPU usage 1551 in the performance data table 155 is equal to or more than the threshold CPU usage 1541, the task generation control module 152 finishes the task generation processing.

Next, the task generation control module 152 determines whether or not the disk transfer rate 1552 in the performance data table 155 is less than the disk (or data) transfer rate 1542 in the system performance threshold table 154 (Step S62). When the disk transfer rate 1552 in the performance data table 155 is equal to or more than the threshold disk transfer rate 1542, the task generation control module 152 finishes the task generation processing.

Next, the task generation control module 152 determines whether or not the IOPS 1553 in the performance data table 155 is less than the IOPS 1543 in the system performance threshold table 154 (Step S63). When the IOPS 1553 in the performance data table 155 is equal to or more than the threshold IOPS 1543, the task generation control module 152 finishes the task generation processing.

Next, the task generation control module 152 determines whether or not the packet transfer rate 1554 in the performance data table 155 is less than the packet transfer rate 1544 in the system performance threshold table 154 (Step S64). When the packet transfer rate 1554 in the performance data table 155 is equal to or more than the threshold packet transfer rate 1544, the task generation control module 152 finishes the task generation processing.

As a result, a new task is not generated when it is determined that utilization of the CPU resources and the I/O resources is sufficient, and a new task is generated when it is determined that utilization of the computer 100 is insufficient.

Lastly, the task generation control module 152 compares the current task count with the upper limit task count (Step S65). When the task count is equal to or more than the upper limit task count, the task generation processing finishes. On the other hand, when the task count is less than the upper limit task count, the task generation control module 152 generates the initial state task (Step S66).

The processing described above prevents more tasks from being generated than the upper limit task count. It should be noted that, in FIG. 29, utilization of the CPU resources and utilization of the I/O resources are both checked. However, the processing may be carried out by checking only the utilization situation of the I/O resources, or by checking only the utilization situation of the CPU resources. Further, the utilization situation of the I/O resources may be checked based on only the IOPS, or based on only the disk transfer rate, or based on only the packet transfer rate. In addition, the check may be carried out by comparing a threshold with a value obtained by combining those performance data.

FIG. 30 is a diagram for showing an example of a storage area performance data table 157 according to the first embodiment.

The storage area performance data table 157 stores a metric of the utilization situation of the I/O resources for each storage area in order to determine whether or not there is an imbalance in the utilization situation of the I/O resources among the storage areas #1 to #4. Each entry in the storage area performance data table 157 is constructed from a storage area name 1571, a metric 1572, and a value 1573. As the metric 1572, for example, an outstanding I/O count 1574, which is the number of I/O requests that have been issued to be processed, a disk transfer rate 1575, and an IOPS 1576 are stored. Those values are set by the same method as for the performance data table 155 shown in FIG. 28.

Figure 31:
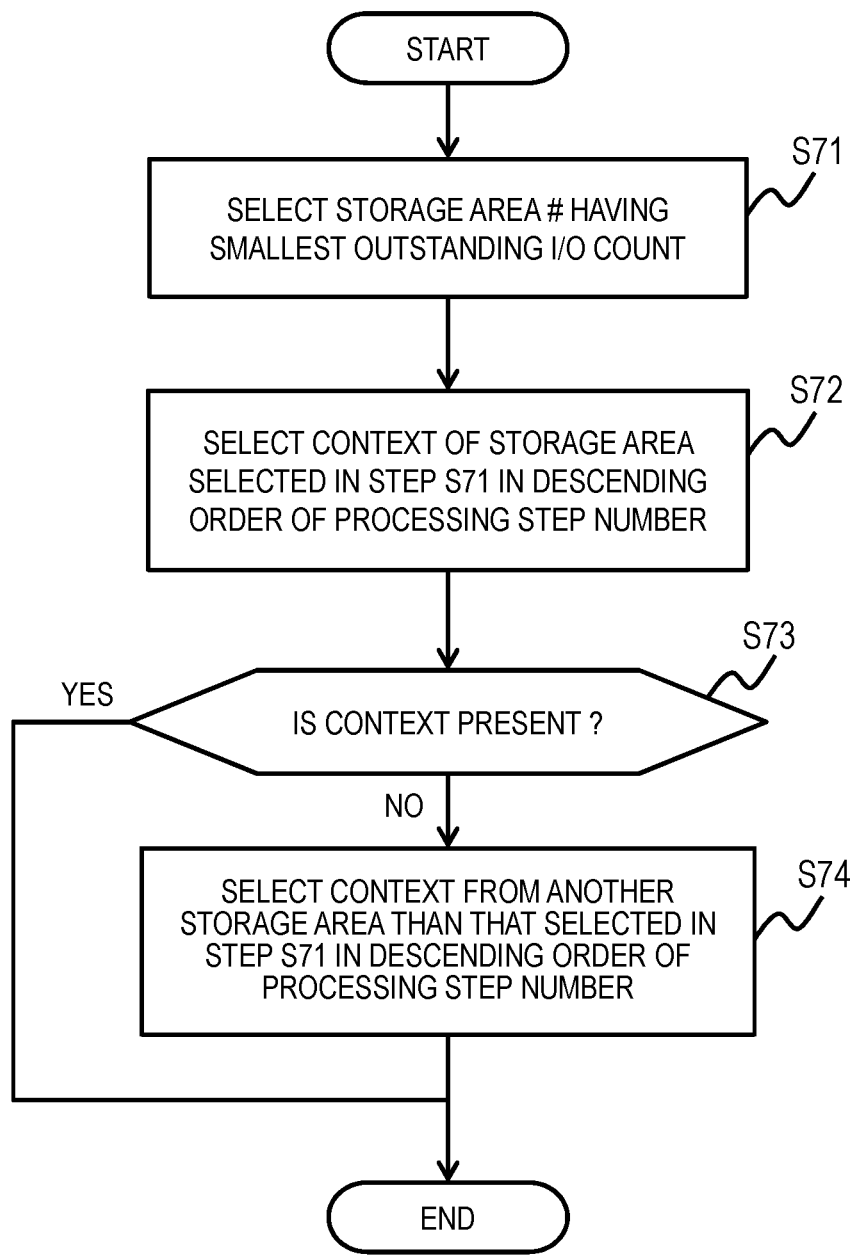
FIG. 31 is a flowchart for illustrating context acquisition processing according to the first embodiment.

FIG. 31 is a flowchart for illustrating context acquisition processing according to the first embodiment. This processing is the processing performed in Step S21 of FIG. 23.

In the context acquisition processing of the first embodiment, when there is an imbalance in utilization of the I/O resources among the storage areas #1 to #4, the context management module 153 of the query execution module 144 selects a context so that a storage area with available storage space among storage areas #1 to #4 is preferentially utilized. As a result, the task utilizing the storage area with available storage space among the storage areas #1 to #4 can be generated. In the example illustrated in FIG. 31, the outstanding I/O count 1574 shown in FIG. 30 is used for the metric indicating the utilization situation of the I/O resources. However, the utilization situation of the I/O resources may also be determined based on the disk transfer rate 1575 or the IOPS 1576 shown in FIG. 30 as the metric.

First, the context management module 153 refers to the storage area performance data table 157, and selects the storage area name 1571 having the smallest outstanding I/O count 1574 (Step S71).

The context management module 153 searches for the context 1530 in which the storage area name 1571 selected in Step S71 is the storage area to which the I/O request is issued in descending order of processing step number (Step S72). The context management module 153 searches the contexts 1530 that the context management module 153 is managing, and when the applicable context 1530 is present, the context acquisition processing finishes (Step S73).

On the other hand, when the applicable context 1530 is not present, the context management module 153 searches for a context 1530 issuing an I/O request to another storage area in descending order of processing step number (Step S74).

Consequently, the context management module 153 of the query execution module 144 preferentially selects the context issuing the I/O request to the storage area name 1571 having the lowest utilization of the I/O resources. As a result, the query execution module 144 can generate the task issuing the I/O request to the storage area having the lowest utilization of the I/O resources.

In the case of a related-art example that does not use this invention, the context 1530 shown in FIG. 18 is generated. Further, because the tasks are generated in the order listed in the unprocessed data list 1562 of the context 1530, tasks for issuing an I/O request to the RowID (P22,1), the RowID (P23,4), the RowID (P24,2), and the storage area #1 are generated.

In contrast, in the first embodiment, tasks are generated by selecting the storage area name 1571 having the smallest outstanding I/O count 1574 from the storage area performance data table 157 shown in FIG. 30, and selecting the context 1530 issuing the I/O request to the selected storage area name 1571. As a result, the query execution module 144 can generate tasks issuing I/O requests evenly to all of the storage areas #1 to #4.

Specifically, because a task that already exists has issued an I/O request to the RowID (P21,2) shown in FIG. 7, when new tasks are added, the new tasks are generated in order of RowID (P120,1), (RowID (P220,2), and RowID (P321,4). In other words, in the related-art technology, the I/O requests are issued with an imbalance to the storage area #1, whereas in this embodiment the I/O requests can be evenly issued to the four storage areas #1 to #4.

Based on the processing described above, in the DBMS 141 configured to dynamically generate tasks, tasks can be generated in which the utilization situation of the CPU resources and the I/O resources is within the thresholds in the system performance threshold table 154. Further, when the DBMS 141 is generating tasks, by preferentially utilizing the resources that are not being sufficiently utilized to generate the tasks, the usage of the CPU resources and the I/O resources can be improved. As a result, an imbalance in the processing toward specific resources can be prevented, which enables the processing capability of the DBMS 141 to be improved.

Second Embodiment

A second embodiment of this invention is now described. The description of the second embodiment focuses on the differences from the first embodiment, and a description of the points that are the same as in the first embodiment is omitted or summarized.

FIG. 32 is a diagram for showing a storage area performance threshold table 154A according to the second embodiment.

The storage area performance threshold table 154A stores a performance threshold for determining whether or not performance is sufficient for each storage area. The threshold settings may be set based on the same method as for the setting of the thresholds in the system performance threshold table 154 shown in FIG. 27 of the first embodiment.

In the storage area performance threshold table 154A, each entry is constructed from a storage area name 1541A, an item 1542A, and a value 1543A. As the item 1542A, for example, a disk transfer rate 1544A threshold and an IOPS 1545A threshold are stored.

Figure 33:
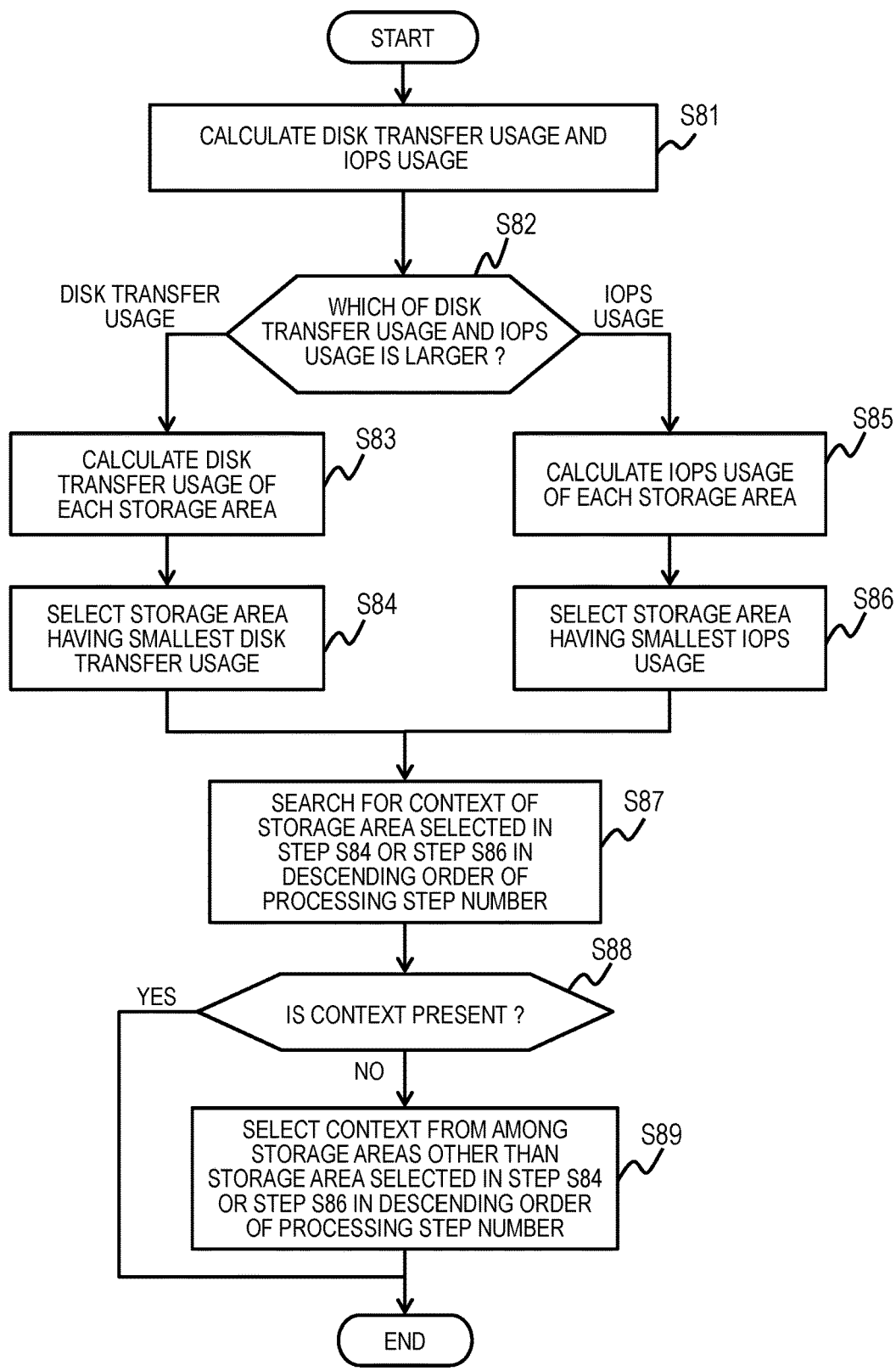
FIG. 33 is a flowchart for illustrating context acquisition processing according to the second embodiment.

FIG. 33 is a flowchart for illustrating context acquisition processing according to the second embodiment. This processing is the processing performed in Step S21 of FIG. 23 in the first embodiment.

The context management module 153 of the query execution module 144 uses the disk transfer rate 1544A (threshold) and the IOPS 1545A (threshold) of the storage area performance threshold table 154A of FIG. 32 as metrics. The context management module 153 calculates a disk transfer usage, which is the usage of the I/O resources based on the disk transfer rate as a metric, and an IOPS usage, which is the usage of the I/O resources based on the IOPS as a metric (Step S81). In this case, the disk transfer usage is a value obtained by dividing the disk transfer rate 1552 in the performance data table 155 shown in FIG. 28 of the first embodiment by the disk transfer rate 1542 (threshold) of each storage area name 1541A of the storage area performance threshold table 154A shown in FIG. 32. Further, the IOPS usage is a value obtained by dividing the IOPS 1553 in the performance data table 155 shown in FIG. 28 of the first embodiment by the IOPS 1543 in the system performance threshold table 154.

The context management module 153 compares the IOPS usage with the disk transfer usage (Step S82). When the disk transfer usage is larger, this means that the disk transfer rate is the determining factor of I/O performance, and hence the processing proceeds to Step S83. The context management module 153 calculates the disk transfer usage of each of the storage areas #1 to #4 (Step S83).

Then, the context management module 153 selects the storage area having the smallest disk transfer usage (Step S84).

On the other hand, when it is determined in Step S82 that the IOPS usage is higher, this means that the IOPS is the determining factor of I/O performance, and hence the context management module 153 calculates the IOPS usage of each of the storage areas #1 to #4 (Step S85), and selects the storage area having the smallest IOPS usage (Step S86).

The context management module 153 searches for the context issuing the I/O request to the storage area selected in Step S84 or Step S86 in descending order of processing step (Step S87), and when the applicable context is present, selects that context (Step S88).

On the other hand, when a context is not found in Step S88, the context management module 153 selects a context from a storage area other than the storage area selected in Step S84 or Step S86 in descending order of processing step (Step S89).

As a result, in the second embodiment, the task issuing the I/O request to the storage area #1 to #4 having the lowest usage of the I/O resources can be generated by calculating the usage of the I/O resources based on the threshold set for each of the storage areas #1 to #4.

Third Embodiment

A third embodiment of this invention is now described. The description of the third embodiment focuses on the differences from the first embodiment, and a description of the points that are the same as in the first embodiment is omitted or summarized.

Figures 34, 35:
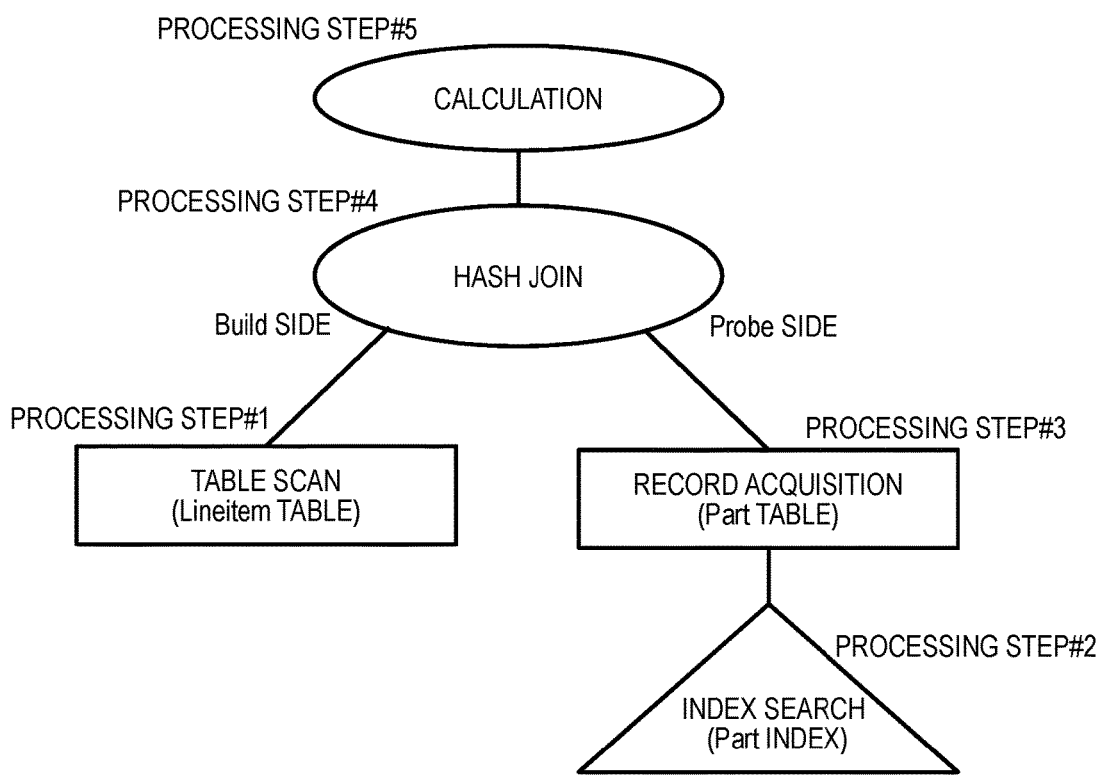
FIG. 34 is a diagram for showing an example of a second query of the DB according to the third embodiment.
FIG. 35 is a diagram for illustrating an example of a query execution plan according to a third embodiment.

FIG. 34 is a diagram for showing an example of a second query of the DB 206 according to the third embodiment.

The query shown in FIG. 34 means that, from the Part table 2051 (column c1 and c2) and the Lineitem table 2054 (column c3 and c4), when the value in column c1 is "130", the value in column c4 is "z", and, the value in the column c2 and the value in the column c3 are the same, the value in the column c1 and the value in the column c4 are extracted.

FIG. 35 is a diagram for illustrating an example of a query execution plan according to a third embodiment.

The query execution plan illustrated in FIG. 35 is an example of a query execution plan generated by the query execution plan generation module 143 when the DBMS 141 has received the query shown in FIG. 34.

The query execution plan corresponding to the query shown in FIG. 34 includes, as illustrated in FIG. 35, a processing step #1 in which the DBMS 141 performs a table scan by reading all of the pages in the DB 206 of the Lineitem table 2054 and acquiring a record that matches a condition, a processing step #2 for performing an index search based on the Part index 2041, a processing step #3 for acquiring a record from the Part table 2051, a processing step #4 for hash joining data read from the Lineitem table 2054 and data read from the Part table 2051, and a processing step #5 for performing a nested loop join on the results. It should be noted that in the query execution plan illustrated in FIG. 35, the data in the Lineitem table 2054 is referred to as a Build side, and the data in the Part table 2051 is referred to as a Probe side.

FIG. 36 is a diagram for showing an example of the cost table 1431 in which a CPU cost is set for each processing step according to the third embodiment.

The CPU cost of each processing step may be acquired in the same manner as for the CPU cost described with reference to FIG. 12. In the cost table 1431 shown in FIG. 36, the CPU cost is set in the same manner as described with reference to FIG. 12 of the first embodiment. For the processing step #4, a CPU cost is set for the above-mentioned Build side and a CPU cost is set for the above-mentioned Probe side as well.

In the third embodiment, a case is described in which three types of context are generated based on the query execution plan illustrated in FIG. 35. It should be noted that in the table scan carried out in this embodiment (processing step #1), 64 DB pages are managed as one management area, and one I/O request is set per 16 DB pages. It should also be noted that the number of pages to be managed may be another management unit, and the page count when issuing the I/O request may be another value.

FIG. 37 is a diagram for showing an example of a fifth context 1530-5 according to the third embodiment.

The fifth context 1530-5 is a context for generating the task issuing the I/O request for the table scan of the processing step #1. The I/O request sequentially reads 16 pages (4 KB/page), and hence the I/O size 1536 is 64 KB. Further, as described above, because 64 DB pages are managed as one management area, for the context 1530-5, four tasks can be generated. Consequently, "4" is set for the generatable number 1533.

Because the DBMS 141 sequentially reads the pages of the DB 206, the I/O pattern 1537 is a sequential pattern. Because the Build processing of the processing step #4 is carried out after the processing step #1, the CPU cost 1538 is set as 10+10=20 based on the cost table 1431 of FIG. 36. It should be noted that the intermediate result 1532 and the execution state 1534 may be set in the same manner as in the first embodiment, and hence a description thereof is omitted here.

FIG. 38 is a diagram for showing an example of a sixth context 1530-6 according to the third embodiment.

The sixth context 1530-6 is a context for generating a task that does not involve issuing an I/O request for the table scan of the processing step #1. Those tasks are generated based on the context 1530-6, which is generated after the task generated based on the fifth context 1530-5 has completed the I/O request. As long as the context 1530-6 exists, the pages in the DB 206 read by the DBMS 141 are stored in the memory 140.

For example, when there are 161 records stored in the 16 DB pages, 160 is set in the generatable number 1533. This task does not involve issuing an I/O request, and hence the storage area name 1535 is set to "NONE", the I/O size 1536 is set to "0", and the I/O pattern 1537 is set to "NONE". The CPU cost 1538 is set to "20", which is the same as for the fifth context 1530-5.

FIG. 39 is a diagram for showing an example of a seventh context 1530-7 according to the third embodiment.

The seventh context 1530-7 is a context for generating a task issuing a random I/O request generated in the processing step #2. Because this context is the same as the context 1530-1 of the first embodiment, a description thereof is omitted here.

Figure 40:
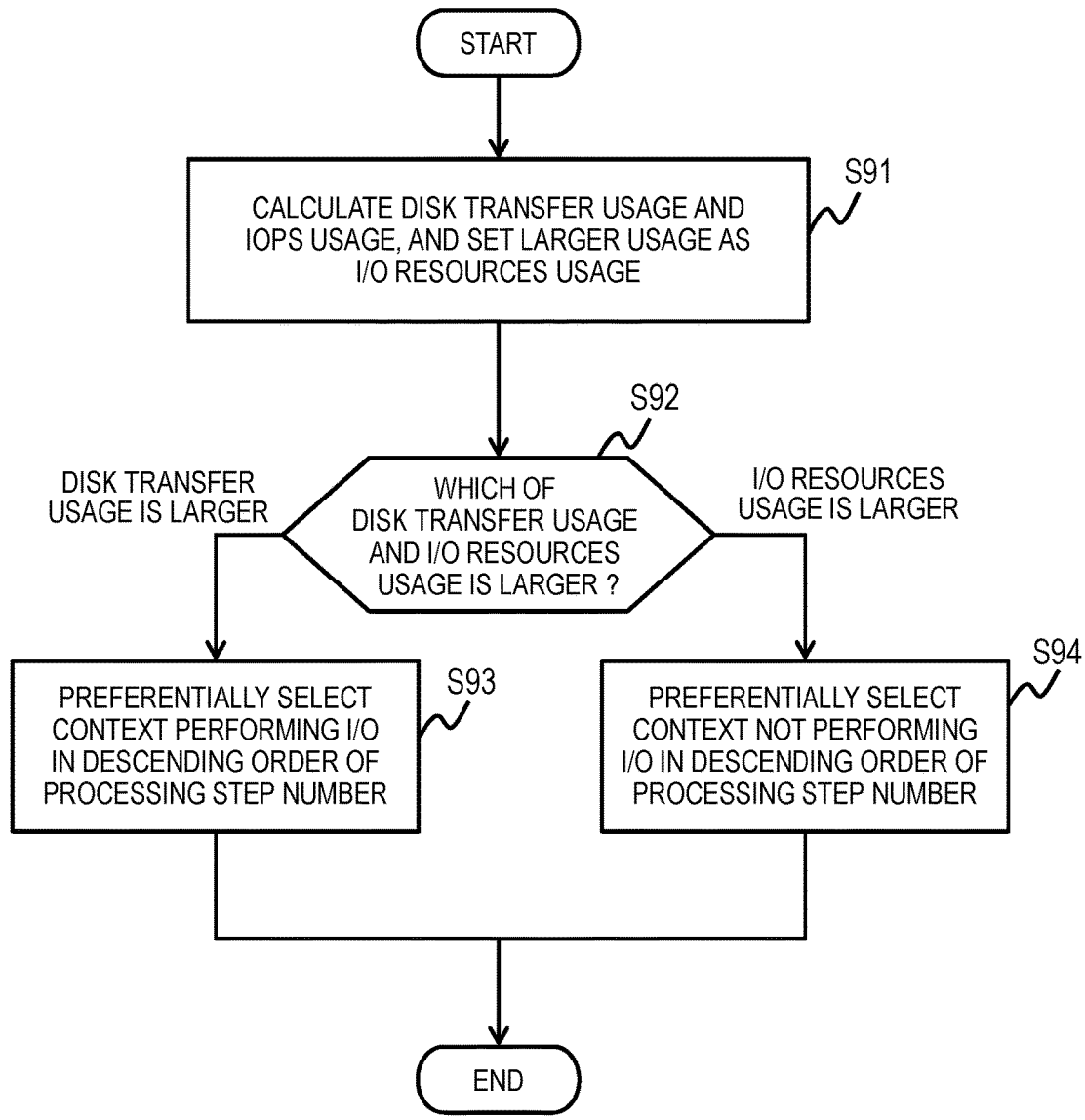
FIG. 40 is a flowchart for illustrating an example of the context acquisition processing according to the third embodiment.

FIG. 40 is a flowchart for illustrating an example of the context acquisition processing according to the third embodiment. This processing is the processing performed in Step S21 of FIG. 23 in the first embodiment.

In the same manner as in the second embodiment, the context management module 153 of the query execution module 144 calculates the disk transfer usage and the IOPS usage, and sets the larger usage as the I/O resources usage (Step S91). The disk transfer usage and the IOPS usage may be calculated based on the same method as in Step S81 of the second embodiment. Further, the context management module 153 calculates the CPU usage. In this case, the CPU usage is a value obtained by dividing the CPU usage 1551 in the performance data table 155 shown in FIG. 28 of the first embodiment by the CPU usage 1541 in the system performance threshold table 154 shown in FIG. 27.

The context management module 153 compares the disk transfer usage with the I/O resources usage (Step S92). When the I/O resources usage is lower, the context management module 153 determines that it is necessary to increase the I/O resources usage, and preferentially searches for the context performing I/O in descending order of processing step number (Step S93). For example, in a situation in which the fifth context 1530-5, the sixth context 1530-6, and the seventh context 1530-7 are present, the fifth context 1530-5 is selected.

On the other hand, when the I/O resources usage is higher, the context management module 153 determines that it is not necessary to increase the I/O resources usage, and preferentially selects a context that is not performing I/O in descending order of processing step number (Step S94). For example, in a situation in which the fifth context 1530-5, the sixth context 1530-6, and the seventh context 1530-7 are present, the sixth context 1530-6 is selected.

It should be noted that in the third embodiment, whether or not the usage of the I/O resources is low is determined by comparing the CPU usage with the I/O resources usage. However, another method may be used for this determination. For example, a value from which it can be externally determined that the I/O resources usage is high may be used.

As a result, in the third embodiment, when utilization of the I/O resources is low, a task having a high usage of the I/O resources can be generated by selecting a context having a high usage of the I/O resources. On the other hand, when utilization of the I/O resources is high, a task having a low usage of the I/O resources can be generated by selecting a context having a low usage of the I/O resources.

A fourth embodiment of this invention is now described. The description of the fourth embodiment focuses on the differences from the third embodiment, and a description of the points that are the same as in the third embodiment is omitted or summarized.

Figure 41:
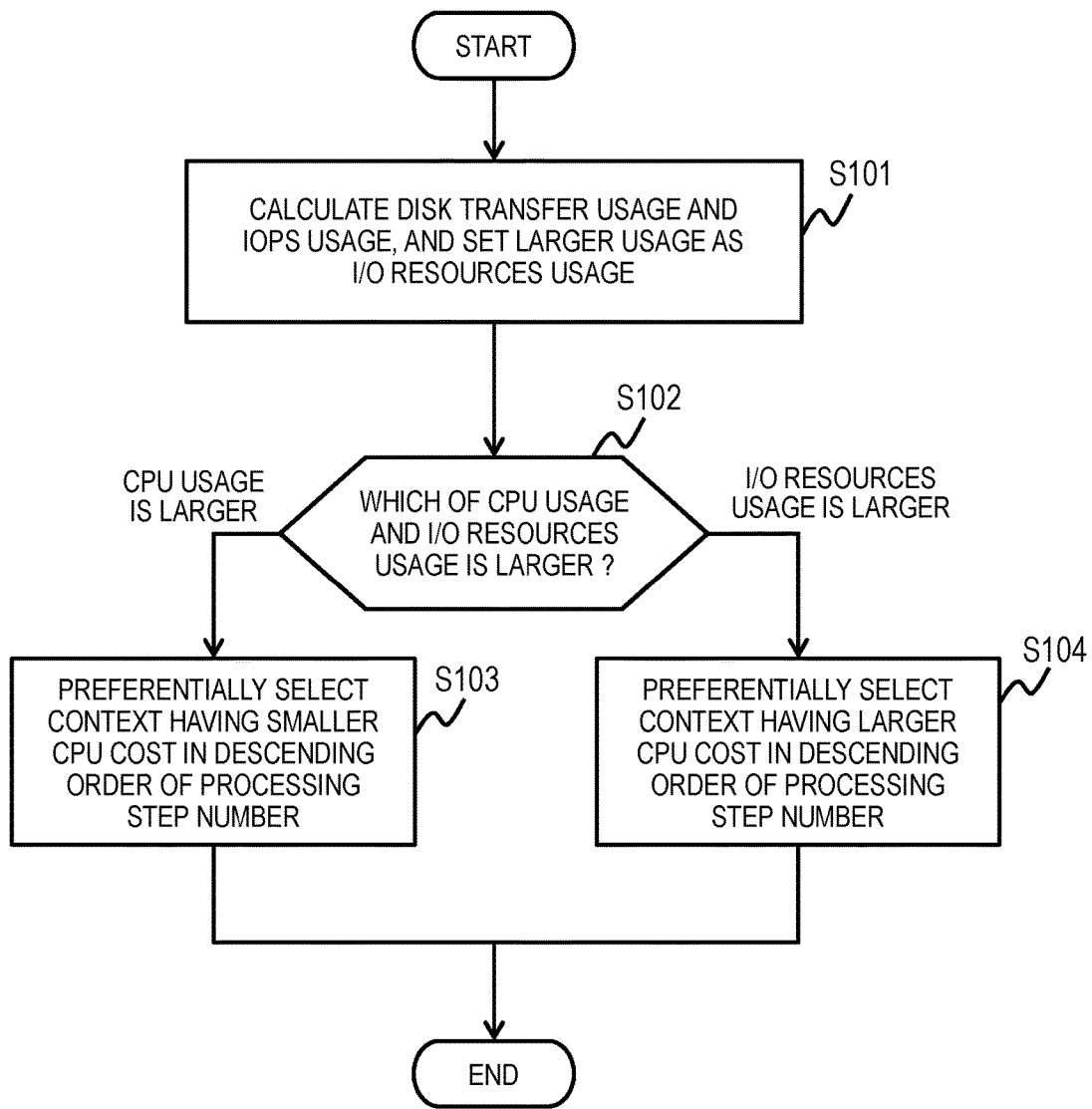
FIG. 41 is a flowchart for illustrating an example of the context acquisition processing according to a fourth embodiment.

FIG. 41 is a flowchart for illustrating an example of the context acquisition processing according to the fourth embodiment. This processing is the processing performed in Step S21 of FIG. 23 in the first embodiment.

In the same manner as in the second embodiment, the context management module 153 of the query execution module 144 calculates the disk transfer usage and the IOPS usage, and sets the larger usage as the I/O resources usage (Step S101). The disk transfer usage and the IOPS usage may be calculated based on the same method as in Step S81. Further, the context management module 153 calculates the CPU usage in the same manner as in the third embodiment.

The context management module 153 compares the CPU usage with the I/O resources usage (Step S102). When the CPU usage is higher, the context management module 153 determines that it is not necessary to increase the CPU usage, and preferentially selects the context having a small CPU cost in descending order of processing step number (Step S103). For example, in a situation in which the fifth context 1530-5, the sixth context 1530-6, and the seventh context 1530-7 are present, the fifth context 1530-5 or the sixth context 1530-6 is selected.

On the other hand, when the CPU usage is lower than the I/O resources usage, the context management module 153 determines that it is necessary to increase the CPU usage, and preferentially selects the context having a high CPU cost in descending order of processing step number (Step S104). For example, in a situation in which the fifth context 1530-5, the sixth context 1530-6, and the seventh context 1530-7 are present, the seventh context 1530-7 is selected.

It should be noted that in the fourth embodiment, whether or not the usage of the CPU resources (the CPU usage) is low is determined by comparing the CPU usage with the I/O resources usage. However, another method may be used for this determination. For example, a value from which it can be externally determined that the CPU usage is high may be used. Alternatively, the determination may be carried out by comparing the CPU usage with a CPU usage threshold set in advance.

As a result, in the fourth embodiment, when the usage of the CPU resources is low, a task that utilizes more CPU resources can be generated by selecting a context having a high CPU cost. It should be noted that the DBMS 141 may be configured to generate, when the CPU usage is low, the task of the processing step 1432 having the highest CPU cost 1433 by referring to the cost table 1431, and when the CPU usage is high, the task of the processing step 1432 having the lowest CPU cost 1433 by referring to the cost table 1431.

It should be also noted that in the third embodiment and the fourth embodiment, a context utilizing available resources from any one of the I/O resources and the CPU resources is selected. However, this selection may also be carried out by comparing with the memory resources. Specifically, whether or not memory resources are available may be determined by comparing the usage of the memory resources with the usage of the I/O resources, and when the memory resources are available, a context utilizing more memory resources may be selected. Alternatively, whether or not memory resources are available may be determined by comparing the usage of the memory resources with the usage of the CPU resources, and when the memory resources are available, a context utilizing more memory resources may be selected.

A fifth embodiment of this invention is now described. The description of the fifth embodiment focuses on the differences from the third embodiment, and a description of the points that are the same as in the third embodiment is omitted or summarized.

Figure 42:
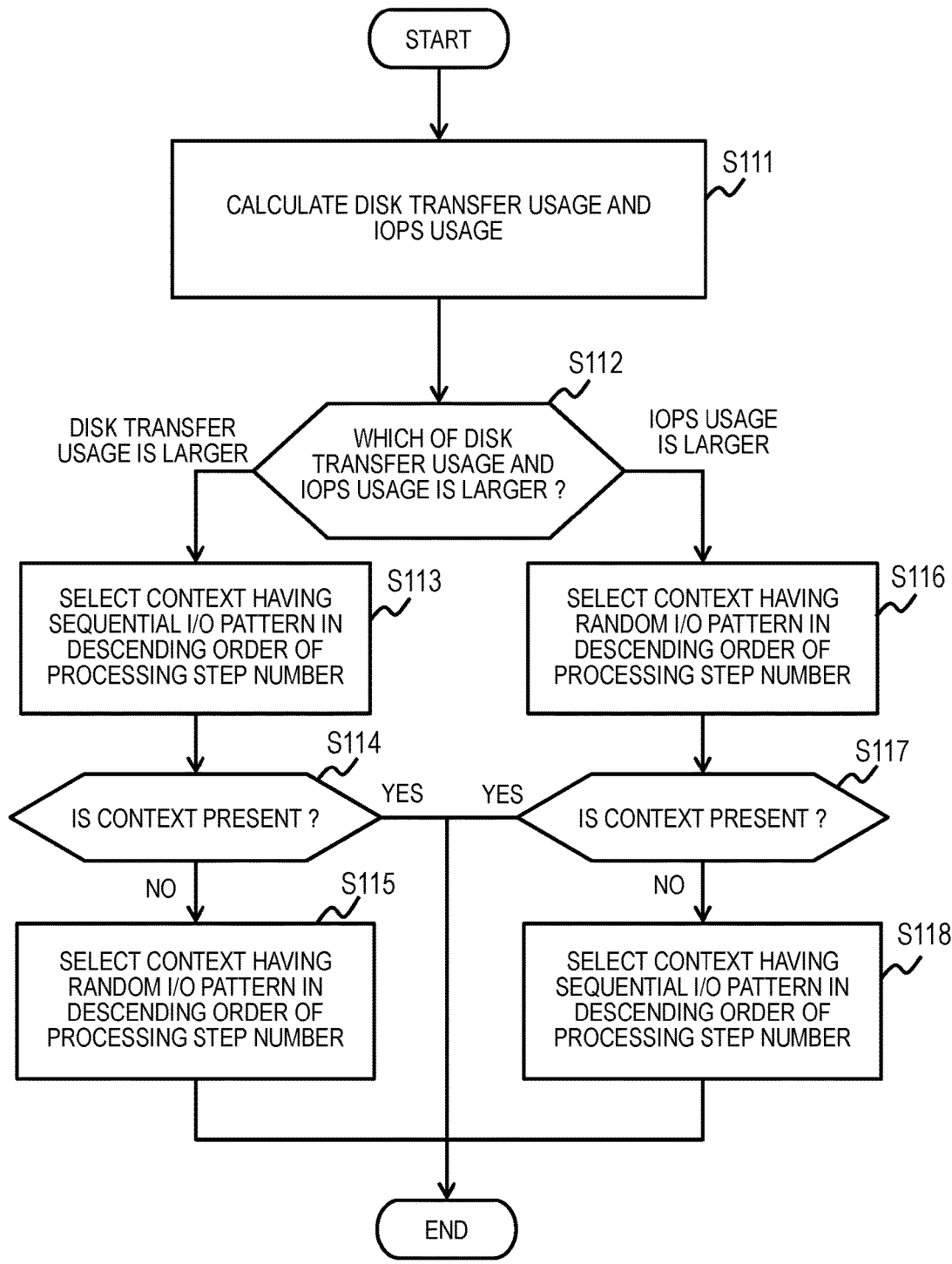
FIG. 42 is a flowchart for illustrating an example of the context acquisition processing according to a fifth embodiment.

FIG. 42 is a flowchart for illustrating an example of the context acquisition processing according to the fifth embodiment. This processing is the processing performed in Step S21 of FIG. 23 in the first embodiment.

In the same manner as in the second embodiment, the context management module 153 of the query execution module 144 calculates the disk transfer usage and the IOPS usage (Step S111). The disk transfer usage and the IOPS usage may be calculated based on the same method as in Step S81.

The context management module 153 compares the IOPS usage with the disk transfer usage (Step S112). When the disk transfer usage is higher, the context management module 153 searches for a context having a sequential I/O pattern 1537 in descending order of processing step number (Step S113). For example, in a situation in which the fifth context 1530-5 and the seventh context 1530-7 are present, the fifth context 1530-5 is selected. When the context management module 153 is able to acquire a context, the processing finishes (Step S114).

When no contexts can be acquired, the context management module 153 searches for contexts having a random I/O pattern 1537 in descending order of processing step number (Step S115). For example, in a situation in which the fifth context 1530-5 and the seventh context 1530-7 are present, the seventh context 1530-7 is selected.

On the other hand, when it is determined in Step S112 that the IOPS usage is higher than the disk transfer usage, the context management module 153 searches for contexts having a random I/O pattern 1537 in descending order of processing step number (Step S116). Then, when the context management module 153 acquires a context, the processing finishes (Step S117).

When a context cannot be acquired, the context management module 153 searches for contexts having a sequential I/O pattern 1537 in descending order of processing step number (Step S118).

It should be noted that in the fifth embodiment, the determination of the current I/O pattern is carried out by comparing the disk transfer usage with the IOPS usage. In other words, when the disk transfer usage is high, the current I/O pattern is determined as being sequential, and when the IOPS usage is high, the current I/O pattern is determined as being random. However, another method may be used for this determination. For example, the determination of the current I/O pattern may be carried out based on a fixed number of IOPS pattern histories stored by the DBMS 141. Further, the OS may determine the I/O pattern, and the DBMS 141 may refer to the result determined by the OS.

As a result, in the fifth embodiment, tasks having the same I/O pattern can be generated by selecting contexts that have the same I/O pattern based on the I/O pattern.

Sixth Embodiment

A sixth embodiment of this invention is now described. The description of the sixth embodiment focuses on the differences from the first embodiment, and a description of the points that are the same as in the first embodiment is omitted or summarized.

Figure 43:
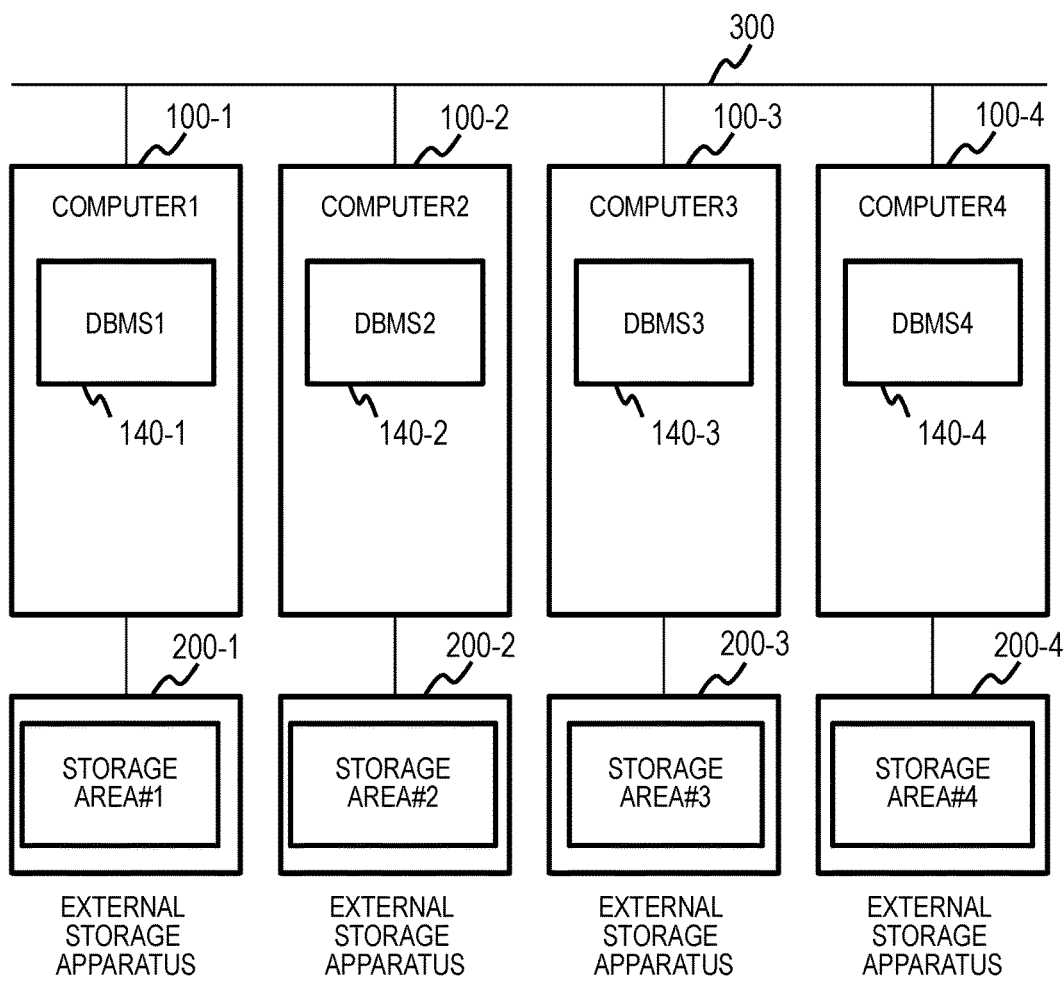
FIG. 43 is a block diagram for illustrating a configuration of a computer system according to a sixth embodiment.

FIG. 43 is a block diagram for illustrating a configuration of a computer system according to the sixth embodiment.

In the sixth embodiment, there is illustrated an example of a database management system in which processing is cooperatively carried out by DBMSs 141-1 to 141-4 operating on a plurality of computers 100-1 to 100-4.

In FIG. 43, an example is illustrated of a database management system configured from four computers (computer 1, computer 2, computer 3, and computer 4) 100-1 to 100-4. The four computers 100-1 to 100-4 are coupled together by the communication network 300.

Each of the computers 100-1 to 100-4 includes an external storage apparatus 200-1 to 200-4, respectively. The computers 100-1 to 100-4 and the external storage apparatus 200-1 to 200-4 are coupled together by a network, respectively. The external storage apparatus 200-1 coupled to the computer 1 (100-1) includes a storage area #1, the external storage apparatus 200-2 coupled to the computer 2 (100-2) includes a storage area #2, the external storage apparatus 200-3 coupled to the computer 3 (100-3) includes a storage area #3, and the external storage apparatus 200-4 coupled to the computer 4 (100-4) includes a storage area #4. It should be noted that, in FIG. 43, although an example is illustrated in which the external storage apparatus 200-1 to 200-4 are independent, one external storage apparatus 200 may be shared by the plurality of computers 100-1 to 100-4. In this case, the shared external storage apparatus 200 may include independent storage areas #1 to #4. It should be noted that the computers 100-1 to 100-4, the DBMSs 140-1 to 140-4, and the external storage apparatus 200-1 to 200-4 each have the same configuration as the computer 100, the DBMS 141, and the external storage apparatus 200, respectively, of the first embodiment.

FIG. 44 is a diagram for showing an example of the DB area management table 147A according to the sixth embodiment. The DB area management table 147A according to the sixth embodiment differs from the DB area management table 147 according to the first embodiment shown in FIG. 10 in additionally having a DBMS identifier 1474. The remaining elements of the DB area management table 147A are the same as in the DB area management table 147 according to the first embodiment.

For the DBMSs 140-1 to 140-4 in which the plurality of computers 100-1 to 100-4 cooperatively perform the processing, the accessing DBMS 140-1 to 140-4 is determined for each of the storage areas #1 to #4. Consequently, the DB area management table 147A includes the DBMS identifier 1474 in addition to the DB object 1471, the page number 1472, and the storage area name 1473. The DBMS identifier 1474, which is information for identifying the DBMSs 140-1 to 140-4, enables which of the computers 100-1 to 100-4 the DBMS 140-1 to 140-4 is operating on to be identified.

Figure 45:
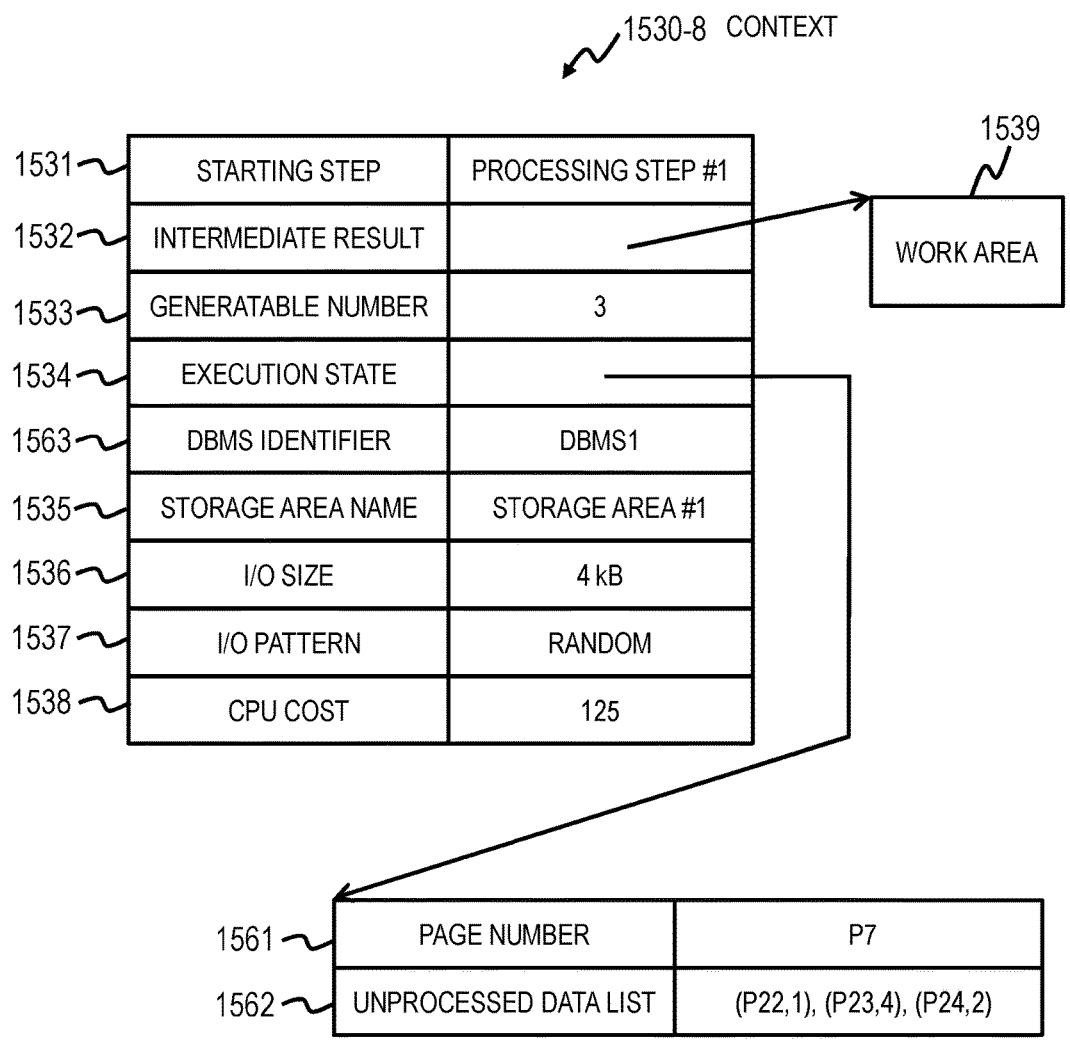
FIG. 45 is a diagram for showing an example of an eighth context according to the sixth embodiment.

FIG. 45 is a diagram for showing an example of an eighth context 1530-8 according to the sixth embodiment.

In a database management system in which the plurality of computers 100-1 to 100-4 including the independent external storage apparatus 200-1 to 200-4 cooperatively perform the processing, the DBMSs 140-1 to 140-4 capable of processing tasks are limited, and hence a DBMS identifier 1563 for setting the DBMS that executes the processing is added to the eighth context 1530-8.

In FIG. 45, an example when the eighth context 1530-8 of the first embodiment is processed by a database management system in which the plurality of computers 100-1 to 100-4 cooperatively perform the processing is shown. The task issuing the I/O request to the storage area #1 can only be processed by the DBMS 1 of the computer 100-1, and hence "DBMS 1" is set in the DBMS identifier 1563.

Figure 46:
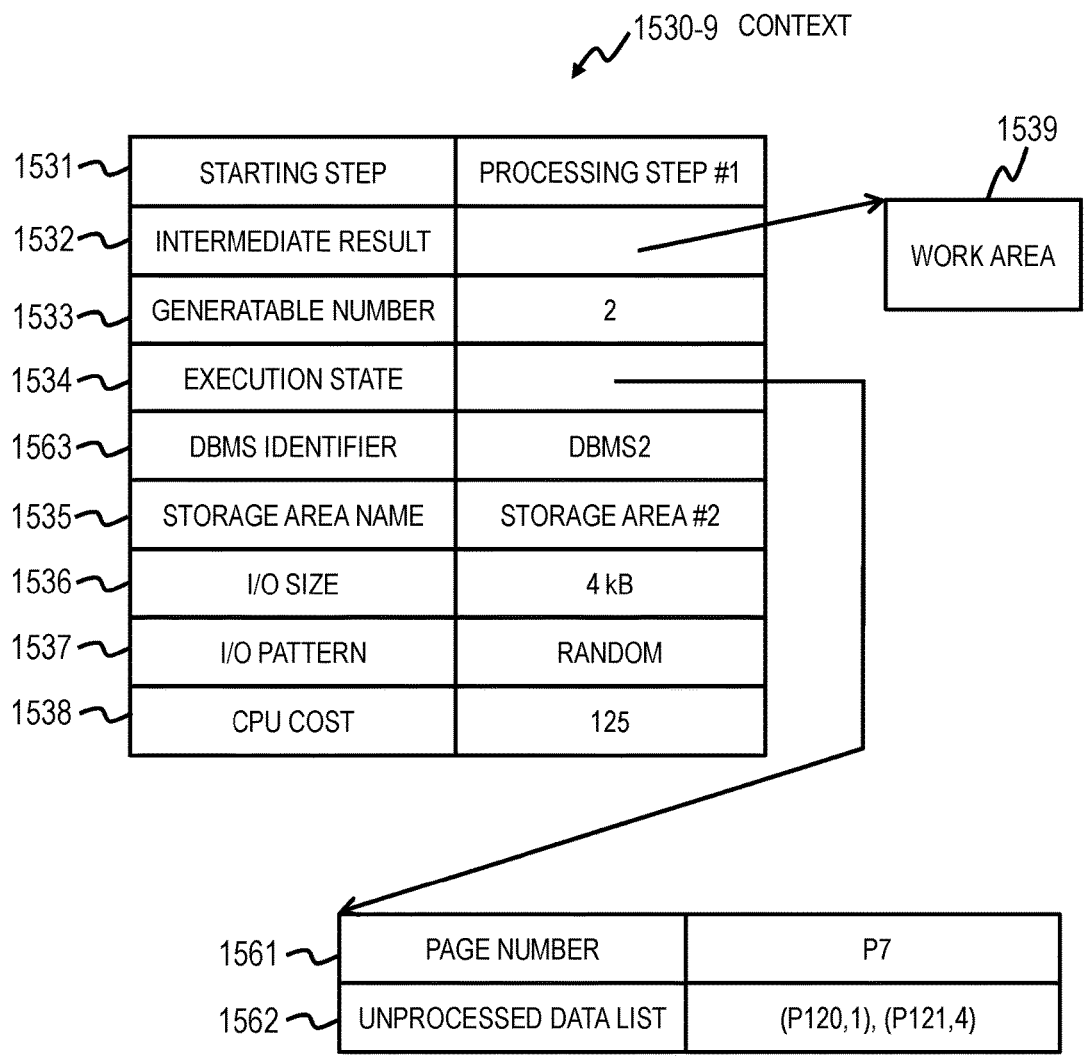
FIG. 46 is a diagram for showing an example of a ninth context according to the sixth embodiment.

FIG. 46 is a diagram for showing an example of a ninth context 1530-9 according to the sixth embodiment.

In FIG. 46, an example when the ninth context 1530-9 shown in the first embodiment is processed by a database management system in which the plurality of computers 100-1 to 100-4 cooperatively perform the processing is shown.

In a database management system in which the plurality of computers 100-1 to 100-4 including the independent external storage apparatus 200-1 to 200-4 cooperatively perform the processing, the DBMSs 140-1 to 140-4 capable of performing the processing are limited.

Consequently, the DBMS identifier 1563 for setting the DBMS 140-1 to 140-4 that executes the processing is added to the ninth context 1530-9. In the example shown in FIG. 46, the task issuing the I/O request to the storage area #2 can only be processed by the DBMS 2 executed by the computer 100-2, and hence "DBMS 2" is set for the DBMS identifier 1563.

Figure 47:
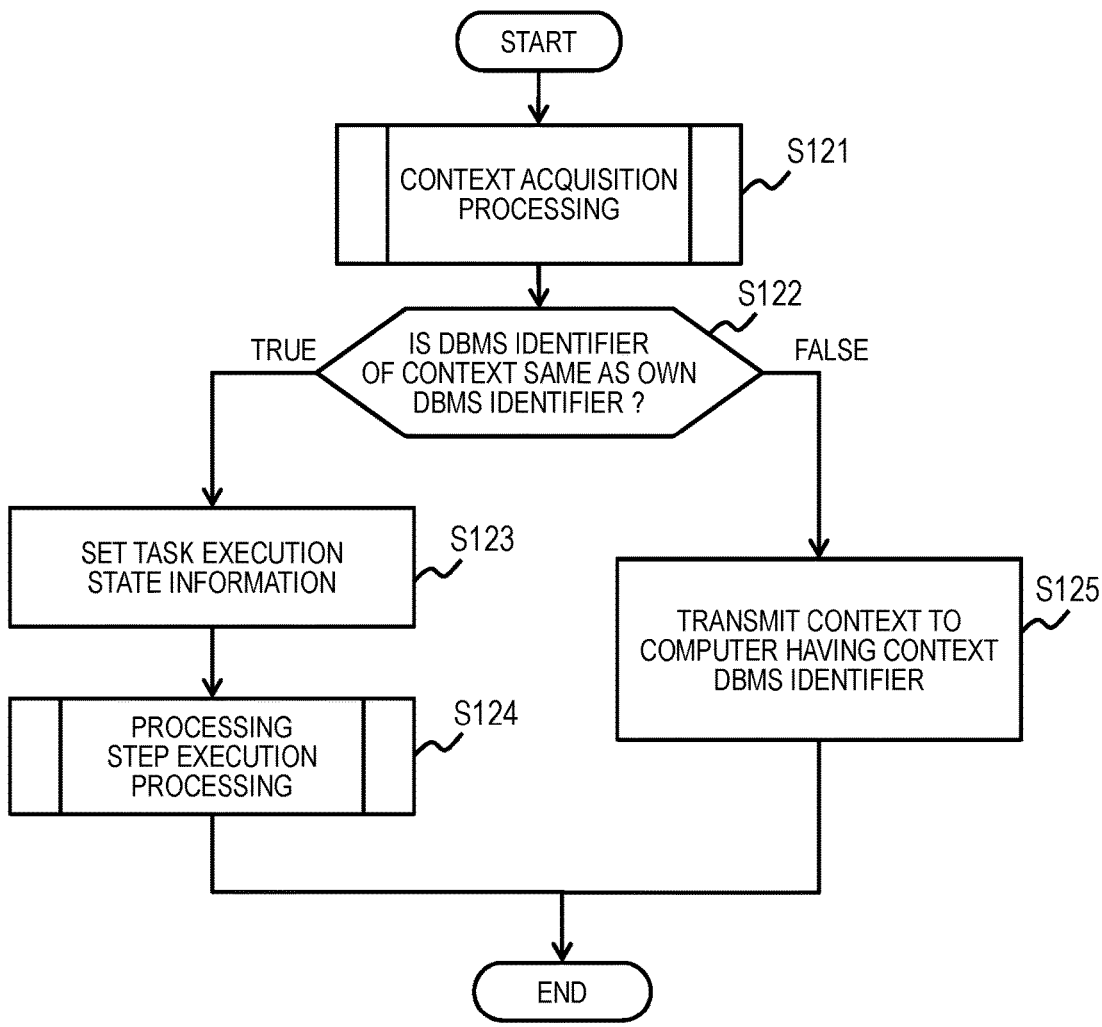
FIG. 47 is a flowchart for illustrating an example of task execution processing according to the sixth embodiment.

FIG. 47 is a flowchart for illustrating an example of task execution processing according to the sixth embodiment. This processing is the processing carried out on the new task in Step S17 of FIG. 22 according to the first embodiment, and applied to a database management system in which the plurality of computers 100-1 to 100-4 cooperatively perform the processing.

The task execution processing is carried out when the query execution module 144 executes a new task for which processing has not been determined. The new task for which processing has not been determined is generated and the processing starts. In order to determine the processing content of the new task, the query execution module 144 performs context acquisition processing (Step S121). The details of the context acquisition processing are described later with reference to FIG. 48.

The query execution module 144 determines the DBMS identifier 1563 of the acquired context, and compares the acquired DBMS identifier 1563 with the identifier of the DBMS 140-1 to 140-4 that is currently performing processing (Step S122). For example, when the task execution processing is being carried out by DBMS 1 (140-1), and the eighth context 1530-8 shown in FIG. 45 is acquired, the DBMS identifier 1563 of the context 1530-8 and the DBMS identifier of the DBMS are the same. In this case, the determination result in Step S122 is "TRUE", and hence the processing proceeds to Step S123. On the other hand, when the ninth context 1530-9 shown in FIG. 46 is acquired, the DBMS identifier 1563 of the context and the DBMS identifier of the DBMS are different. In this case, the determination result in Step S122 is "FALSE", and hence the processing proceeds to Step S125.

When the DBMS identifier 1563 of the context 1530 and the DBMS identifier of the DBMS are the same, the query execution module 144 sets the task execution state information (Step S123). In this processing, similarly to Step S22 of FIG. 23, the query execution module 144 uses the acquired context to set the task execution state information 73 (shown in FIG. 13).

Then, the query execution module 144 performs processing step execution processing (Step S124). In this processing, similarly to Step S22 of FIG. 23 according to the first embodiment, the query execution module 144 executes the processing step execution processing based on the state set in Step S123.

When the DBMS identifier 1563 of the context and the DBMS identifier of the DBMS are different, the context acquired in order to execute the task is transmitted to the DBMS 140-1 to 140-4 having the DBMS identifier 1563 of the context via the communication network 300 (Step S125).

This context is again registered in the context management module 153 on the DBMS 140-1 to 140-4 to which the context is transmitted. Then the task is generated based on the context on the DBMS 140-1 to 140-4 to which the context is transmitted, and the task is executed.

Figure 48:
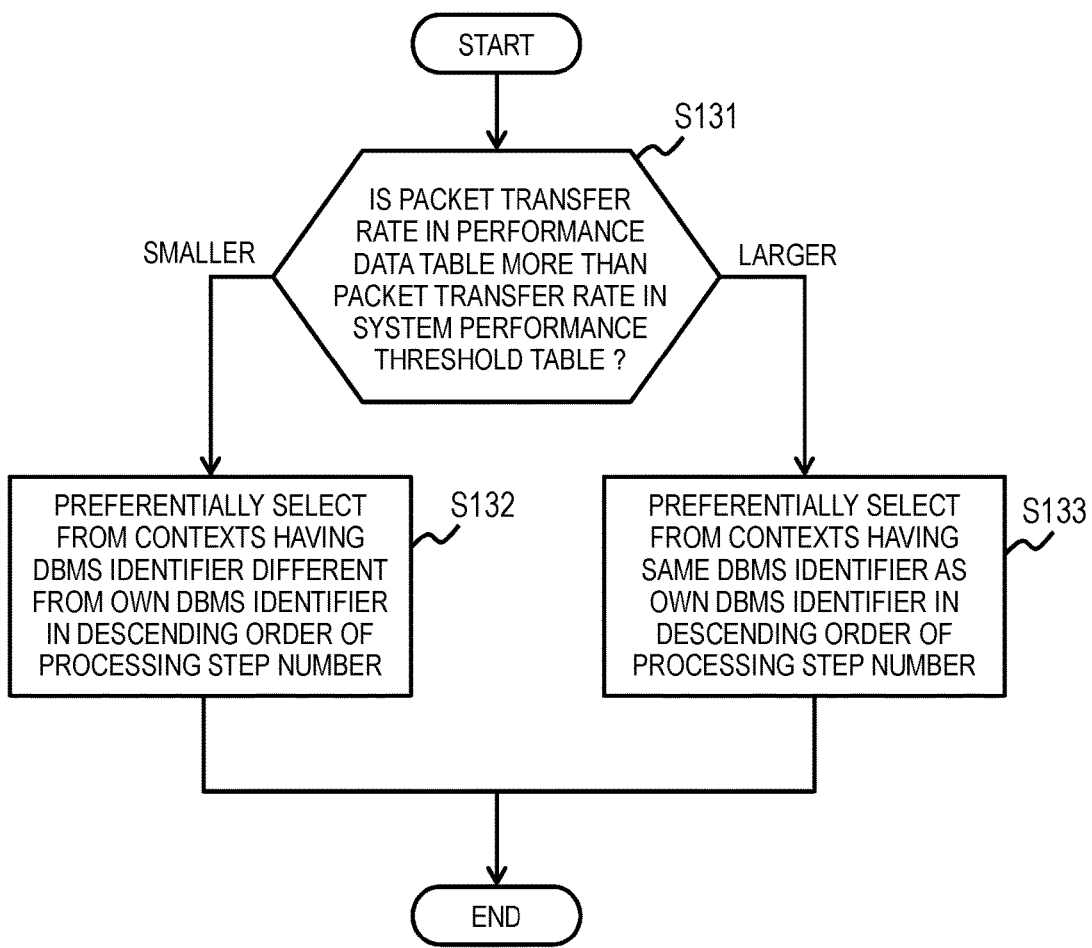
FIG. 48 is a flowchart for illustrating an example of the context acquisition processing according to the sixth embodiment.

FIG. 48 is a flowchart for illustrating an example of the context acquisition processing according to the sixth embodiment.

In the database management system in which the plurality of computers 100-1 to 100-4 cooperatively perform the processing, a value is set for the packet transfer rate 1544 in the system performance threshold table 154 (shown in FIG. 27) and the packet transfer rate 1554 in the performance data table 155 (shown in FIG. 28).

The query execution module 144 compares the packet transfer rate 1554 in the performance data table 155 with the packet transfer rate 1544 in the system performance threshold table 154 (Step S131). When the packet transfer rate 1554 in the performance data table 155 is smaller, the query execution module 144 preferentially selects the context having a DBMS identifier 1563 different from its own DBMS identifier in descending order of processing step number (Step S132).

On the other hand, when the packet transfer rate 1554 in the performance data table 155 is larger, the query execution module 144 preferentially selects the context having the same DBMS identifier 1563 as its own DBMS identifier in descending order of processing step number (Step S133).

As a result, in the sixth embodiment, when utilization of the network resources, which are the I/O resources, relating to data transfer among the computers 100-1 to 100-4 is low, a task that uses more network resources can be generated.

In each of the first embodiment to the sixth embodiment described above, the task is selected based on one metric. However, in actual practice, the CPU resources, the I/O resources, and the memory resources may be utilized by selecting the task using a mixture of a plurality of metrics instead of just one metric. For example, a new task may be generated when the memory usage is less than a specified threshold. Further, when generating a task, the task may be generated based on the memory usage. A task having high utilization of the memory resources is generated when the memory usage is less than a specified memory usage, and a task having low utilization of the memory resources is generated when the memory usage is more than a specified memory usage.

In each of the first embodiment to the sixth embodiment, a case in which one AP 148 executes one query in one DBMS 141 is described. However, there may be a plurality of APs 148, a plurality of DBMSs 141, and a plurality of queries.

Further, when the DBMS 141 executes a plurality of queries, the context may be identified based on a transaction ID, a user ID, a schema ID, and the like, and the order in which the tasks are generated may be changed based on the priority of each query. When a plurality of DBMSs 141 are running, the order in which the tasks are generated may be changed based on the priority of each DBMS 141 by identifying the context based on the identifier of each DBMS 141. In addition, when executing a plurality of DBMSs 141 with virtual machines, the order in which the tasks are generated may be changed based on the priority of the each virtual machine by identifying the context based on an identifier of each virtual machine.

Seventh Embodiment

A seventh embodiment of this invention is now described. The description of the seventh embodiment focuses on the differences from the first embodiment, and a description of the points that are the same as in the first embodiment is omitted and summarized.

Figure 49:
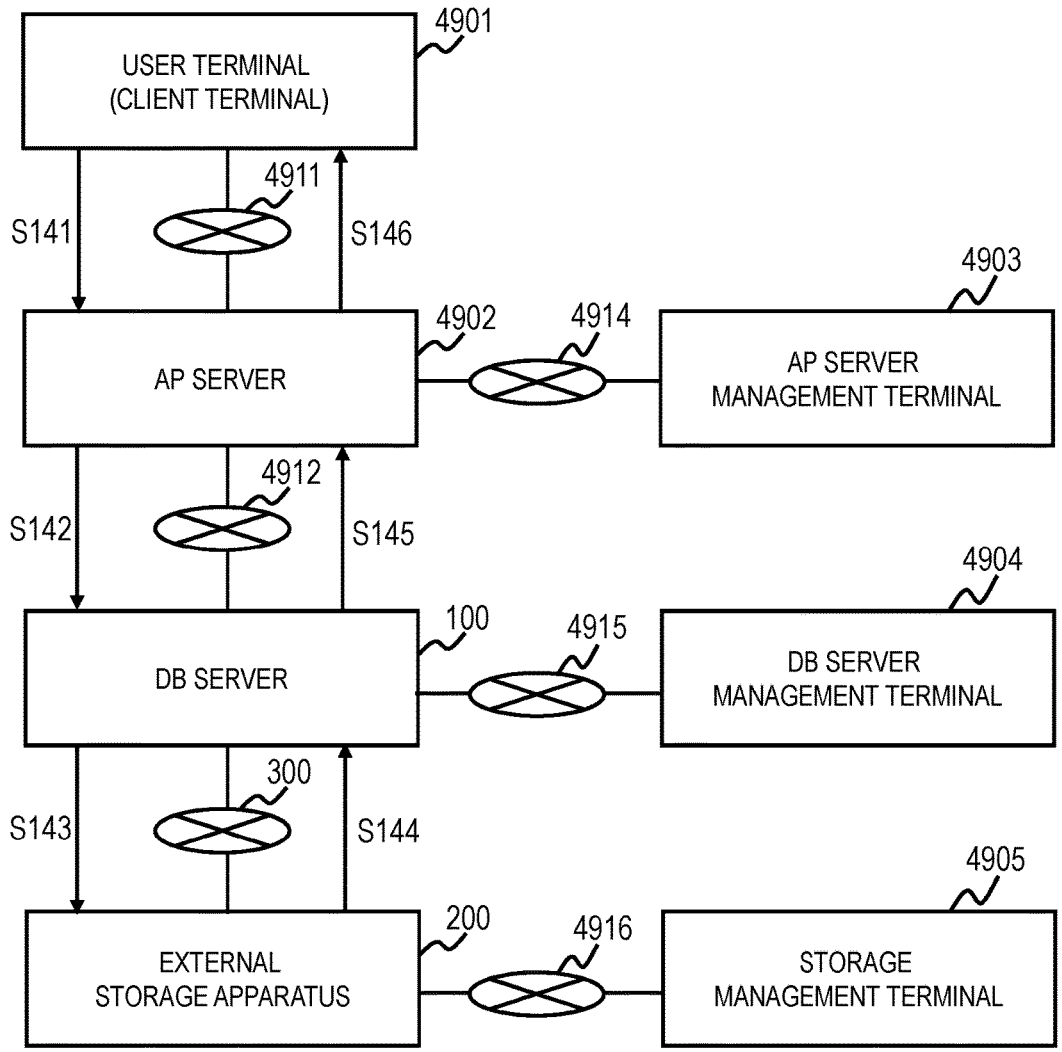
FIG. 49 is a block diagram for illustrating a configuration of a computer system according to a seventh embodiment.

FIG. 49 is a block diagram for illustrating a configuration of a computer system according to the seventh embodiment.

An application server (hereinafter referred to as "AP server") 4902 is communicably coupled via a communication network 4912 to a computer (hereinafter referred to as "DB server") 100 on which the DBMS 141 is running. Further, the DB server 100 is communicably coupled via a communication network 300 to an external storage apparatus 200.

A user terminal (client terminal) 4901 is communicably coupled via a communication network 4911 to the AP server 4902. The DB server 100 is configured to execute the DBMS 141 managing the DB 206 according to the first embodiment. The external storage apparatus 200 stores the DB 206. The AP server 4902 is configured to execute the AP issuing a query to the DBMS 141 executed by the DB server 100. The user terminal 4901 is configured to issue a request to the AP to be executed by the AP server 4902. It should be noted that the computer system may include a plurality of the user terminals 4901, or a plurality of the AP servers 4902.

An AP server management terminal 4903 is coupled via a communication network 4914 to the AP server 4902. A DB server management terminal 4904 is coupled via a communication network 4915 to the DB server 100. A storage management terminal 4905 is coupled via a communication network 4916 to the external storage apparatus 200. The AP server management terminal 4903 is a terminal configured to manage the AP server 4902. The DB server management terminal 4904 is a terminal configured to manage the DB server 100. The storage management terminal 4905 is a terminal configured to manage the external storage apparatus 200. The DB server administrator or a user may perform the settings for the DBMS 141 from the DB server management terminal 4904. It should be noted that at least two of the management terminals 4903 to 4905 may be shared (integrated). Further, at least two of the communication networks 4911, 4912, 4914, 4915, 4916, and 300 may be shared (integrated).

In the seventh embodiment, for example, processing is executed as follows.

In Step S141, the user terminal 4901 issues a request (hereinafter referred to as "user request") to the AP server 4902.

In Step S142, the AP server 4902 generates a query based on the user request received in Step S141. Then, the AP server 4902 issues the generated query to the DB server 100.

In Step S143, the DB server 100 receives the query from the AP server 4902, and executes the received query. The DB server 100 issues an input/output request (e.g., a data read request) for the data required to execute the received query to the external storage apparatus 200. The DB server 100 may issue a plurality of data input/output requests in parallel for execution of one query. As a result, the DB server 100 may perform the request of Step S143 a plurality of times in parallel for execution of one query.

In Step S144, the external storage apparatus 200 transmits a response to the DB server 100 regarding the data input/output request issued in Step S143. The external storage apparatus 200 may issue a plurality of the responses of Step S144 in parallel.

In Step S145, the DB server 100 generates an execution result of the query, and transmits the generated result to the AP server 4902.

In Step S146, the AP server 4902 receives the execution result of the query, and then transmits a response to the user request received in Step S141 to the user terminal 4901 based on the execution result.

It should be noted that there may simultaneously be a plurality of user requests issued to the AP server 4902 or queries issued to the DB server 100.

Thus, in the seventh embodiment, this invention can be applied even when the AP server 4902 is separated from the DB server 100.

The computers, processing units, and processing means described related to this invention may be, for a part or all of them, implemented by dedicated hardware.

The variety of software exemplified in the embodiments can be stored in various media (for example, non-transitory storage media), such as electro-magnetic media, electronic media, and optical media and can be downloaded to a computer through communication network such as the Internet.

This invention is not limited to the foregoing embodiments but includes various modifications. For example, the foregoing embodiments have been provided to explain this invention to be easily understood; they are not limited to the configurations including all the described elements.

What is claimed is:

1. A database management apparatus configured to manage a database stored in a storage apparatus, the database management apparatus comprising:
   a query reception module configured to receive a query to the database;
   a query execution plan generation module configured to generate a query execution plan comprising information representing one or more database operations required to execute the received query; and
   a query execution module configured to dynamically generate, when executing the received query based on the generated query execution plan, a task for executing a database operation and to execute the dynamically generated task,
   the query execution module being configured to:
      acquire usages of resources to be utilized to execute the received query;
      determine whether a new task should be generated based on a utilization situation of resources based on the acquired usages of resources including a first determination criterion based on a disk transfer rate and a second determination criterion based on input/output operations per second (IOPS);
      when it is determined that the new task should be generated, generate the new task based on the utilization situation of the resources when executing a next database operation of the database operation to be executed by the generated task; and
      execute the new task in parallel with the generated task.

2. The database management apparatus according to claim 1, wherein the IOPS includes a number of input requests from the storage apparatus issued to the storage apparatus.

3. The database management apparatus according to claim 1, wherein the query execution module is configured to:
   use a utilization situation of CPU resources as the utilization situation of the resources; and
   acquire a CPU usage as the utilization situation of the CPU resources, and generate a new task based on the CPU usage.

4. The database management apparatus according to claim 3,
   wherein the query execution plan generation module is configured to store cost information in which a CPU cost of each processing step has been set in advance, and
   wherein the query execution module is configured to compare the CPU usage with a threshold set in advance, and when the CPU usage is less than the threshold, generate a task for executing a processing step having a larger CPU cost by referring to the cost information, and when the CPU usage is equal to or more than the threshold, generate a task for executing a processing step having a smaller CPU cost by referring to the cost information.

5. The database management apparatus according to claim 1, wherein the query execution module is configured to generate the new task when the data transfer rate is less than a data transfer rate threshold set in advance, and, the number of IOPS is less than a threshold for the number of IOPS set in advance.

6. The database management apparatus according to claim 5, wherein the query execution module is configured to:
   use a utilization situation of CPU resources in addition to the I/O resources as the utilization situation of the resources;
   acquire a CPU usage as the utilization situation of the CPU resources; and
   generate the new task when the CPU usage is less than a CPU usage threshold set in advance, and, the data transfer rate is less than the data transfer rate threshold set in advance, and, the number of IOPS is less than the threshold for the number of IOPS set in advance.

7. The database management apparatus according to claim 1, wherein the query execution module is configured to select and generate from classified tasks a task utilizing available resources for which the utilization situation of the resources is less than a predetermined threshold when generating the new task.

8. The database management apparatus according to claim 1, wherein the query execution module is configured to:
   use a utilization situation of I/O resources as the utilization situation of the resources; and
   acquire, as the utilization situation of the I/O resources, a number of IOPS of each storage area in the database, which has been partitioned into a plurality of storage areas, of the storage apparatus, and generate a task issuing an I/O request for data in the partitioned database to a storage area having the lowest number of IOPS.

9. The database management apparatus according to claim 1, wherein the query execution module is configured to acquire a usage of I/O resources and a CPU usage as the utilization situation of the resources, and when the usage of the I/O resources is less than the CPU usage, generate a task utilizing the I/O resources, and when the usage of the I/O resources is more than the CPU usage, generate a task utilizing a processor in the database management apparatus.

10. The database management apparatus according to claim 1, wherein the query execution module is configured to:
   use a utilization situation of I/O resources as the utilization situation of the resources; and identify an I/O pattern as the utilization situation of the I/O resources, the new task having the same I/O pattern as the identified I/O pattern.

11. The database management apparatus according to claim 1,
wherein the database management apparatus is coupled to another computer via a network, and
wherein the query execution module is configured to:
use a utilization situation of I/O resources as the utilization situation of the resources;
acquire a transfer packet count, which is a number of packets transmitted to and received from the another computer, as the utilization situation of the I/O resources; and
generate the new task when the transfer packet count is less than a transfer packet count threshold set in advance.

12. A database management method for managing a storage apparatus having stored therein a computer, the database management method comprising:
a first step of receiving, by the computer, a query to the database;
a second step of generating, by the computer, a query execution plan comprising information representing one or more database operations required to execute the received query;
a third step of dynamically generating, by the computer, when executing the received query based on the generated query execution plan, a task for executing a database operation; and
a fourth step of executing, by the computer, the dynamically generated task,
wherein the third step comprises:
acquiring usages of resources to be utilized to execute the received query;
determining whether a new task should be generated based on a utilization situation of resources based on the acquired usages of resources including a first determination criterion based on a disk transfer rate and a second determination criterion based on input/output operations per second (IOPS); and
when it is determined that a new task should be generated, generating the new task based on the utilization situation of the resources when executing a next database operation of the database operation to be executed by the generated task,
wherein the fourth step comprises executing the new task in parallel with the generated task.

13. The database management method according to claim 12, wherein the third step comprises:
a step of generating a new task when the data transfer rate is less than a data transfer rate threshold set in advance, and, the number of IOPS is less than a threshold for the number of IOPS set in advance.

14. A non-transitory computer-readable storage medium having stored thereon a program for managing a database stored in a storage apparatus with a computer, the program controlling the computer to execute:
a first step of receiving a query to the database;
a second step of generating a query execution plan comprising information representing one or more database operations required to execute the received query;
a third step of dynamically generating a task for executing a database operation when executing the received query based on the generated query execution plan; and
a fourth step of executing the dynamically generated task,
wherein the third step comprises acquiring usages of resources to be utilized to execute the received query, determining whether a new task should be generated based on a utilization situation of resources based on the acquired usages of resources including a first determination criterion based on a disk transfer rate and a second determination criterion based on input/output operations per second (IOPS); and when it is determined that the new task should be generated, generating the new task based on the utilization situation of the resources when executing a next database operation of the database operation to be executed by the generated task, and
wherein the fourth step comprises executing the new task in parallel with the generated task.

* * * * *